US00RE48199E

(19) United States
(12) Reissued Patent
Strickland et al.

(10) Patent Number: US RE48,199 E
(45) Date of Reissued Patent: *Sep. 8, 2020

(54) CONTAINMENT BAG FOR USE IN A COMMERCIAL DISPOSAL CONTAINER

(71) Applicant: PacTec, Inc., Clinton, LA (US)

(72) Inventors: Lewis Strickland, Subic Bay Freeport (PH); Troy Town, Clinton, LA (US); Michael Schilling, Clinton, LA (US)

(73) Assignee: PacTec, Inc., Clinton, LA (US)

( * ) Notice: This patent is subject to a terminal disclaimer.

(21) Appl. No.: 15/621,727

(22) Filed: Jun. 13, 2017

Related U.S. Patent Documents

Reissue of:
(64) Patent No.: 9,056,710
Issued: Jun. 16, 2015
Appl. No.: 14/059,176
Filed: Oct. 21, 2013

U.S. Applications:
(63) Continuation of application No. 12/960,032, filed on Dec. 3, 2010, now Pat. No. 8,562,212, which is a continuation-in-part of application No. 11/464,114, filed on Aug. 11, 2006, now Pat. No. 7,845,511, which is a continuation-in-part of application No. 11/473,673, filed on Jun. 23, 2006, now Pat. No. 8,499,953.

(51) Int. Cl.

| | |
|---|---|
| ***B65D 1/06*** | (2006.01) |
| ***B65D 88/16*** | (2006.01) |
| ***B65D 90/04*** | (2006.01) |
| ***B65D 88/12*** | (2006.01) |

(52) U.S. Cl.
CPC ..... *B65D 88/1681* (2013.01); *B65D 88/123* (2013.01); *B65D 90/046* (2013.01); *B65D 2590/046* (2013.01)

(58) Field of Classification Search
CPC ..... B65D 88/1681; B65D 88/123; B65D 90/046; B65D 2590/046
See application file for complete search history.

(56) References Cited

U.S. PATENT DOCUMENTS

| | | | |
|---|---|---|---|
| 525,951 | A | 9/1894 | Flaniken |
| 977,698 | A | 12/1910 | Barksdale |
| 2,215,689 | A | 9/1940 | Dickson |
| 2,216,527 | A | 10/1940 | Weiss et al. |
| 2,524,584 | A | 10/1949 | Zehr |
| 2,574,345 | A | 11/1951 | Montgomery |
| 2,683,262 | A | 7/1954 | Foss |
| 2,712,797 | A | 7/1955 | Woehrle et al. |

(Continued)

OTHER PUBLICATIONS

"Soft-Sided Waste Containers," Innovative Technology Summary Report (Jul. 1999), 33 pages.

*Primary Examiner* — Jeffrey L. Gellner
(74) *Attorney, Agent, or Firm* — Jones Walker LLP

(57) ABSTRACT

A non-self supporting containment bag used in conjunction with a dumpster container. The bag has a center opening that extends across the top of the bag, substantially centered on the top of the bag. The top of the bags is formed with sufficient spare material at the ends of the rectangular shaped bag to allow the top to be inverted over the sides of the container. The opening when closed, has sufficient material to form opposing triangular folds that extends above the top of the bag and the top of the container, when the bag is lining the container.

9 Claims, 29 Drawing Sheets

(56) References Cited

U.S. PATENT DOCUMENTS

| | | | | | |
|---|---|---|---|---|---|
| 2,861,735 | A | | 11/1958 | Faltin | |
| 2,883,041 | A | | 4/1959 | Pfeifer et al. | |
| 2,998,340 | A | | 8/1961 | Conway et al. | |
| 3,167,209 | A | | 1/1965 | Jones | |
| 3,219,240 | A | | 11/1965 | Campbell, Jr. | |
| 3,306,328 | A | | 2/1967 | Markus | |
| 3,422,867 | A | | 1/1969 | Wu | |
| 3,459,357 | A | | 8/1969 | Egger et al. | |
| 3,468,102 | A | | 9/1969 | Farrar et al. | |
| 3,481,461 | A | | 12/1969 | Paxton | |
| 3,539,360 | A | | 11/1970 | Wood | |
| 3,570,751 | A | | 3/1971 | Trewella | |
| 3,578,213 | A | | 5/1971 | Clarke et al. | |
| 3,617,418 | A | | 11/1971 | Miller | |
| 3,756,469 | A | | 9/1973 | Clark et al. | |
| 3,834,528 | A | | 9/1974 | Pickford et al. | |
| 3,888,163 | A | | 6/1975 | Watanabe | |
| 3,893,595 | A | | 7/1975 | Khanna et al. | |
| D241,713 | S | | 10/1976 | Plummer | |
| D241,783 | S | * | 10/1976 | Sykes | D3/268 |
| 3,987,959 | A | | 10/1976 | Deards et al. | |
| 4,119,127 | A | | 10/1978 | Klug | |
| 4,194,652 | A | | 3/1980 | Williamson et al. | |
| 4,207,937 | A | | 6/1980 | Sandeman et al. | |
| 4,325,469 | A | * | 4/1982 | Gurian | A45C 3/00 156/250 |
| 4,385,953 | A | | 5/1983 | Beck | |
| 4,395,067 | A | | 7/1983 | Robin | |
| 4,461,402 | A | | 7/1984 | Fell et al. | |
| 4,557,400 | A | | 12/1985 | Clarke | |
| 4,570,820 | A | | 2/1986 | Murphy | |
| 4,671,733 | A | | 6/1987 | Krein | |
| 4,710,967 | A | * | 12/1987 | Petschner | B65D 88/1618 206/806 |
| 4,730,942 | A | | 3/1988 | Fulcher | |
| 4,754,914 | A | | 7/1988 | Wischusen, III | |
| 4,759,742 | A | | 7/1988 | Achelpohl | |
| 4,817,824 | A | | 4/1989 | LaFleur et al. | |
| 4,850,508 | A | | 7/1989 | Lee | |
| 4,871,046 | A | | 10/1989 | Turner | |
| 5,041,317 | A | | 8/1991 | Greyvenstein | |
| 5,073,035 | A | | 12/1991 | Williams | |
| 5,110,005 | A | | 5/1992 | Schilling | |
| 5,127,893 | A | | 7/1992 | LaFleur | |
| 5,297,870 | A | | 3/1994 | Weldon | |
| 5,467,853 | A | | 11/1995 | Pelletier | |
| 5,664,887 | A | | 9/1997 | LaFleur | |
| 5,810,478 | A | | 9/1998 | LaFleur | |
| 5,842,789 | A | * | 12/1998 | Derby | B65D 88/1618 383/24 |
| 5,938,338 | A | | 8/1999 | McDonough | |
| 5,993,062 | A | * | 11/1999 | Shackleton | B65D 88/1681 383/17 |
| 6,029,723 | A | | 2/2000 | Baquero et al. | |
| 6,079,934 | A | | 6/2000 | Beale | |
| 6,155,772 | A | | 12/2000 | Beale | |
| 6,186,713 | B1 | | 2/2001 | Bonerb | |
| 6,250,488 | B1 | | 6/2001 | Narahara et al. | |
| 6,305,845 | B1 | | 10/2001 | Navin | |
| 6,427,475 | B1 | | 8/2002 | DeFelice et al. | |
| RE37,915 | E | | 12/2002 | Lapoint, III | |
| 7,073,676 | B1 | | 7/2006 | Town | |
| 7,074,174 | B2 | | 7/2006 | Lindgren et al. | |
| 7,845,511 | B1 | | 12/2010 | Strickland et al. | |
| 8,191,722 | B1 | | 6/2012 | Town | |
| 8,499,953 | B1 | | 8/2013 | Town | |
| 8,562,212 | B1 | | 10/2013 | Strickland et al. | |
| 8,777,034 | B1 | * | 7/2014 | Town | B65D 90/046 220/1.6 |
| 2004/0081374 | A1 | * | 4/2004 | Richardson, Jr. | B65D 88/1612 383/38 |

* cited by examiner

Amended FIG 5

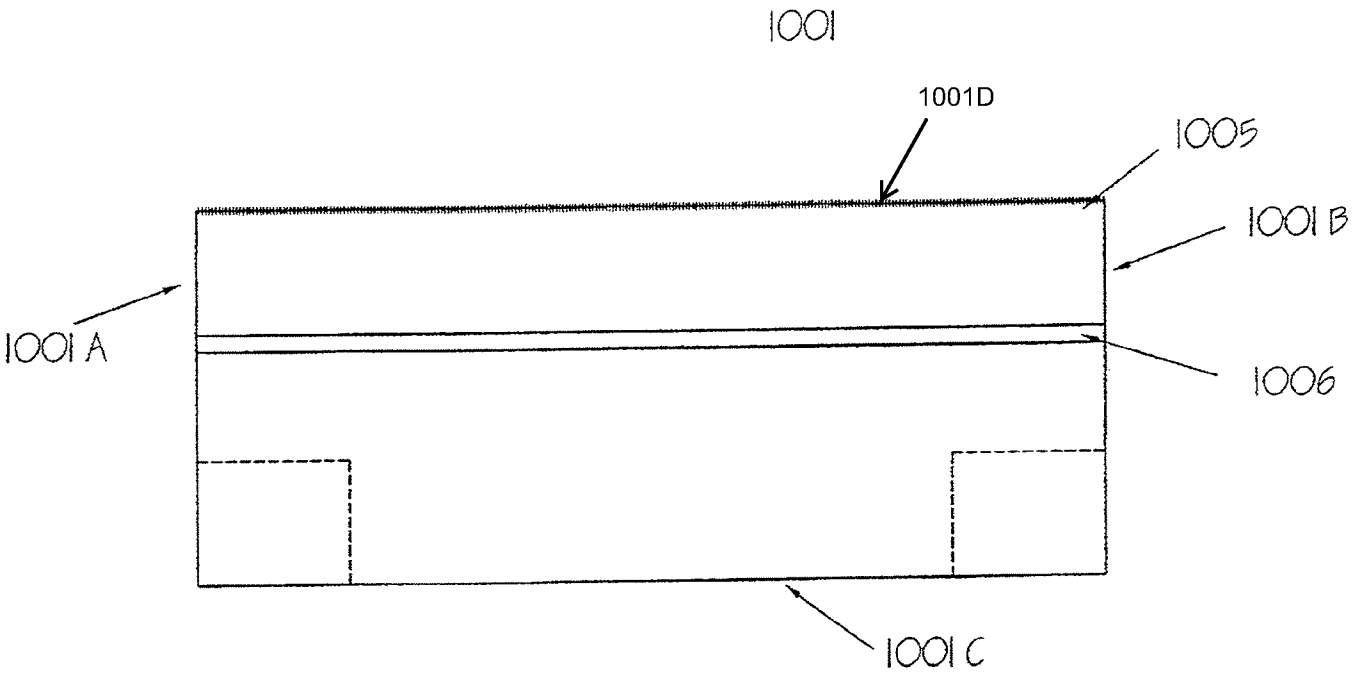
Amended FIG 7A

CONTAINMENT BAG FOR USE IN A COMMERCIAL DISPOSAL CONTAINER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a continuation of U.S. application Ser. No. 12/960,032 filed on Dec. 3, 2010, (now U.S. Pat. No. 8,562,212) which application was a continuation-in-part of Ser. No. 11/464,114, filed on Aug. 11, 2006 (now U.S. Pat. No. 7,845,511) which is a continuation-in-part of Ser. No. 11/473,673 filed on Jun. 23, 2006 (now U.S. Pat. No. 8,499,953), all of which this application claims priority to and which are hereby incorporated by reference in their entirety.

FIELD OF THE INVENTION

This invention relates to containment bags used with large dumpster style disposal containers in the storage, transportation and disposal of wastes.

PRIOR ART

In plant renovations or other type of construction or cleanup projects, wastes are generated and stored in large on-site dumpster-containers, such as rolloff containers, end dump containers, and gondola rail car containers. When hazardous materials (such as tank cleaning sludge, wet or dry waste materials, chemical plant by-products, rail wastes, high heat wastes), odorous materials, or fine particulate matter (for instance, incinerator ashes, powders, asbestos materials) are to be stored in an onsite dumpster container for later transportation and disposal, it is desirable to line the container to protect the container from exposure to the materials and to make later disposal easier. Currently, either large sheets of plastic are used to line the container or container bags are utilized. The existing container bags have openings that are closable using a series of ties or cords. Given the large size of the containers, closing the series of ties can be a time consuming chore. Further, the ties fail to make an effective closure, allowing small particle materials to leak.

SUMMARY OF THE INVENTION

The invention consists of non-self supporting containment bag constructed with a single top opening, with sufficient spare material at the ends of the rectangular shaped bag to allow the top to be inverted over the sides of the container. The opening is then closed. The bag may include a plurality of pick-up or attachment loops or handles may also be attached to the outer bag material. The bag may additionally have an internal lining.

OBJECTS OF THE INVENTION

It is an object of the invention to provide a simple easily installable liner for a dumpster container that is sealable.

It is another object to provide a liner for use in a dumpster container having attachment or pick-up handles.

It is another object of the invention to provide a containment bag for use in a dumpster container having a secondary liner on the interior of the containment bag.

It is an object to the invention to have an easily manufactured bag from a single piece of fabric, including a multilayered piece of fabric.

BRIEF DESCRIPTION OF THE DRAWINGS

FIG. 7A is a plan view of the single sheet construction.

DETAILED DESCRIPTION OF THE INVENTION

Figure 1:
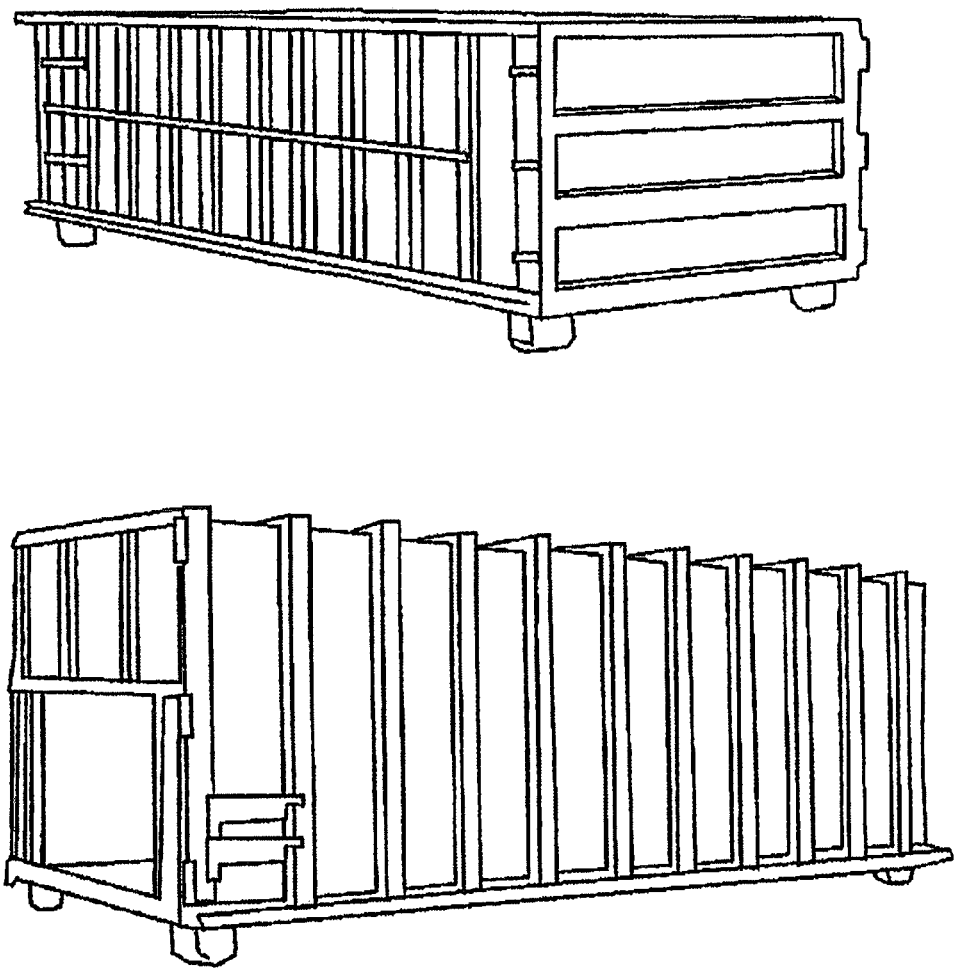
FIG. 1 is a perspective view of a rolloff container.
Figure 2:
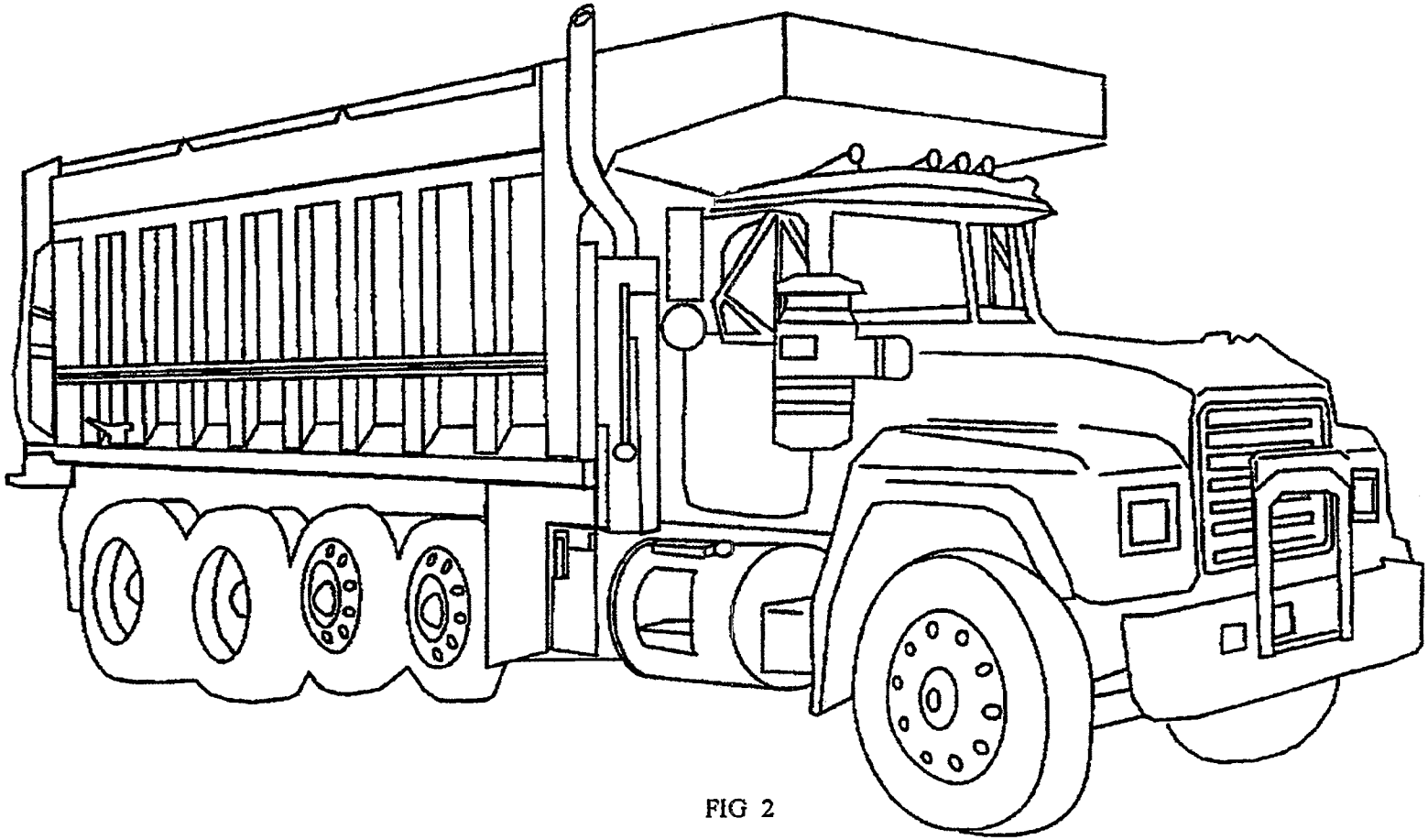
FIG. 2 is a perspective view of an end dump container.
Figure 3:
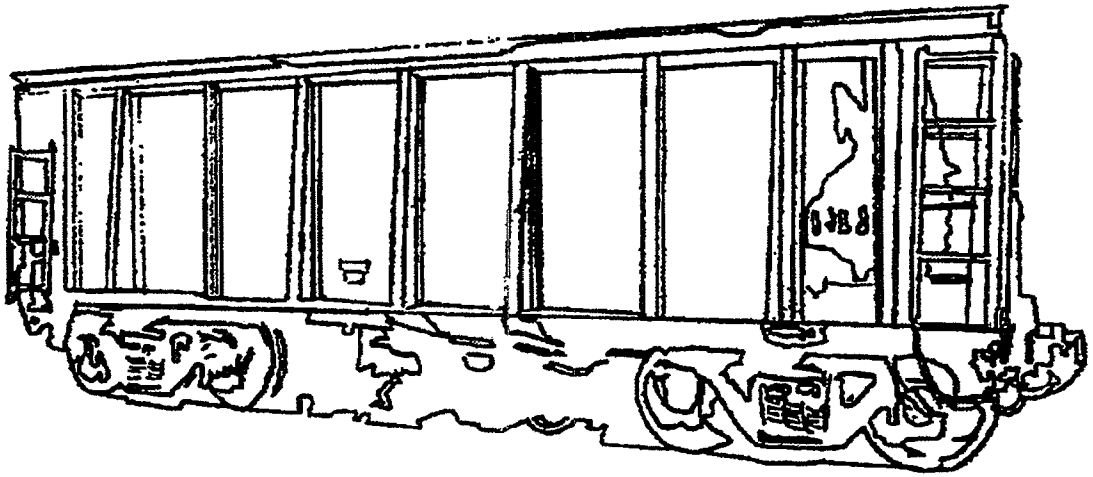
FIG. 3 is a perspective view of a gondola rail car container.
Figure 4:
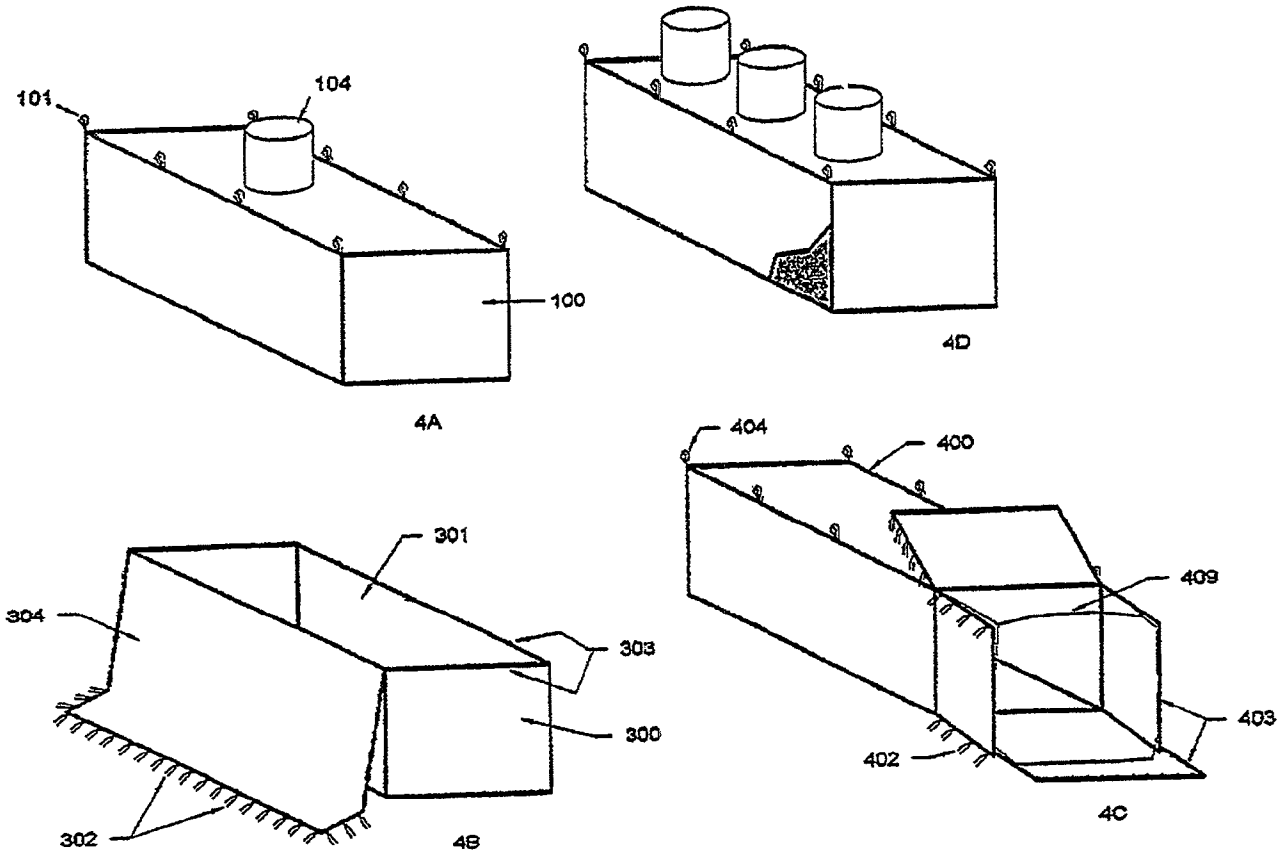
FIG 4 Prior Art
FIG. 4 shows a series of prior art container bags.

Three existing dumpster type containers are shown in FIGS. 1-3: a roll off container (FIG. 1), an end-dump container (FIG. 2) and a rail car gondola (FIG. 3). These containers range in size from 67'×10'×6' for a rail gondola to 16'×8'×4' for an end dumpster container. Shown in FIG. 4 are typical prior art container bags. FIG. 4a shows a single spout container bag 100 having a series of grab loops 101. The grab loops 101 are used to attach and support the container bag to a dumpster container. The single spout 104 provides access to the interior of the bag for loading materials into the container bag. After loading, the single spout would be tied shut with a suitable tie, such as a rope. The spout type bag can come with multiple spout configurations as shown in FIG. 4d.

FIG. 4b shows a prior art cigar top bag 300. The cigar top bag 300 has a top opening 301, which is closable by a cover 304 having a series of ties 302 located around the periphery of the top opening 301. Ties 302 attach to loops 303. FIG. 4c shows a prior art bread bag style container bag 400. The bread bag style is similar to the cigar top bag except the opening in the cigar top bag is located on the end instead of the top. Again, the opening is closable by tying a series of ties 402 to a matching series of loops 403. Also shown is a series of handles, shown here shown as loops 404, for attaching and supporting the container bag to a disposal container. Prior art bags are generally constructed of polypropylene and may have an interior lining 409, such as a polyethylene barrier attached to the interior of the bag shell.

Figure 5:
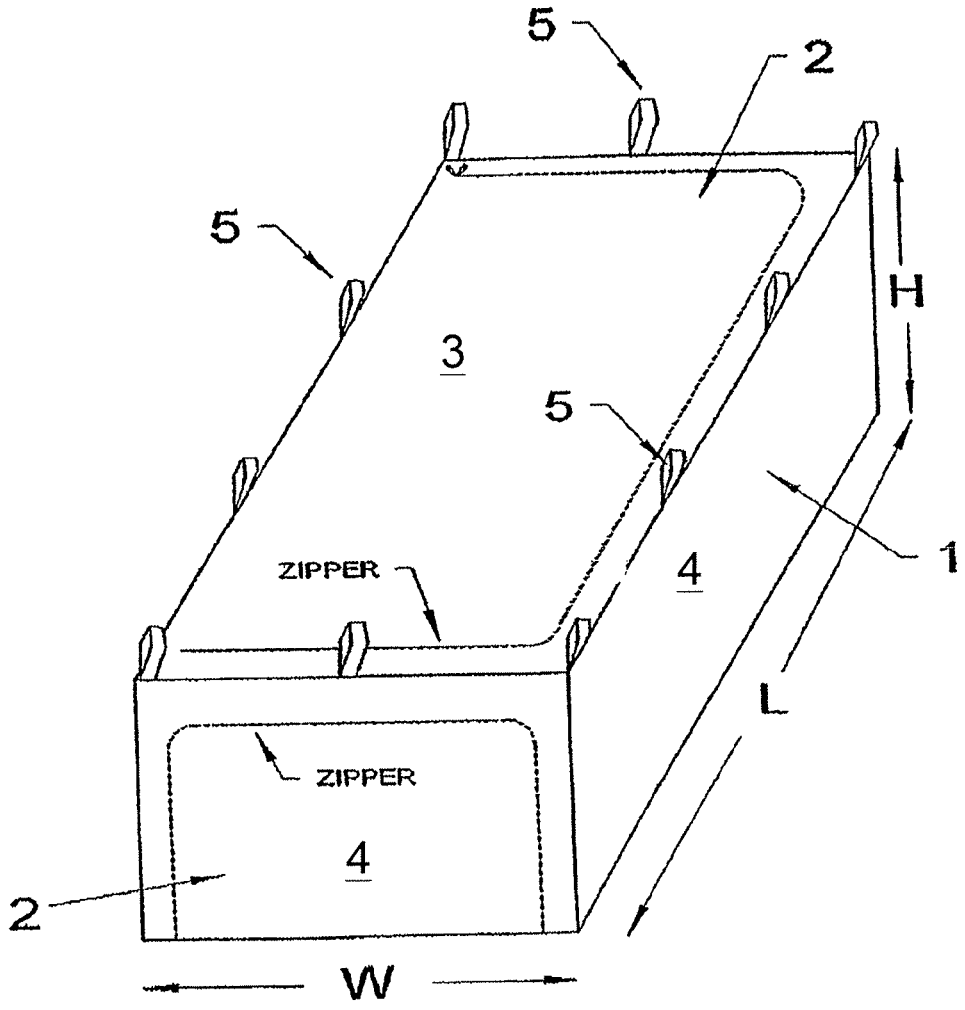
FIG. 5 is a perspective view of the containment bag invention.

Shown in FIG. 5 is containment bag 1. Containment bag 1 is made of a non-self supporting material and is designed to be inserted in a commercial dumpster container. The containment bag 1 may be made of woven or non-woven materials with a 3-6 oz woven polypropylene preferred. Other materials such as polyvinyl chloride (PVC, reinforced or non-reinforced), woven or non-woven polyethylene or other suitable materials, such as woven fiberglass may be used. The bag material may also be coated, such as woven or non-woven polypropylene bag having a polyethylene or polypropylene coating placed on the interior or exterior of the bag.

The bag should have an opening 2 that is closable. Bag opening 2 should be placed on the bag for ease of loading and storage of materials and, in some instances, for ease of removal of the stored materials. For instance, the bag shown in FIG. 5 has two closable openings, one positioned on the top of the bag 3, and one positioned on the side of the bag 4. The two openings are shown for demonstration purposes. In the standard embodiment, a container bag will have a single opening. As shown, the openings are closable with a closing means, such as a zipper. A preferred zipper is a #10 coil nylon zipper, with two pulls positioned on the zipper tracks. Other zipper or zipper types can be used.

Also shown are support handles 5. The support handles 5 can serve two purposes: (1) to attach the bag to the container, and thereby support the bag for fill; and, in some instances, (2) to assist in moving or removal of the bag from the container. Handles 5 can be loops, such as double D-ring straps or 2-inch loops, or lines or ties, and can be made from suitable materials, such as polypropylene or polyester webbing. When used to attach the bag to the container, the handles will attach to points on the container, generally, at least one handle on each corner (see FIGS. 1 and 2 showing containers having a fabric top attached to the container with handles).

Additionally, the bag 1 may incorporate a separate inner liner 10 (not shown). Inner liners are useful when the stored materials are wet or liquids. Suitable material can be low-density polyethylene, with 6-10 mil thickness being preferred. One such liner is disclosed in U.S. Pat. No. 5,110,005, herein incorporated by reference. Inner liner may be sewn to the outer bag, or attached by other means, for instance heat-sealed to the outer bag.

Figure 6:
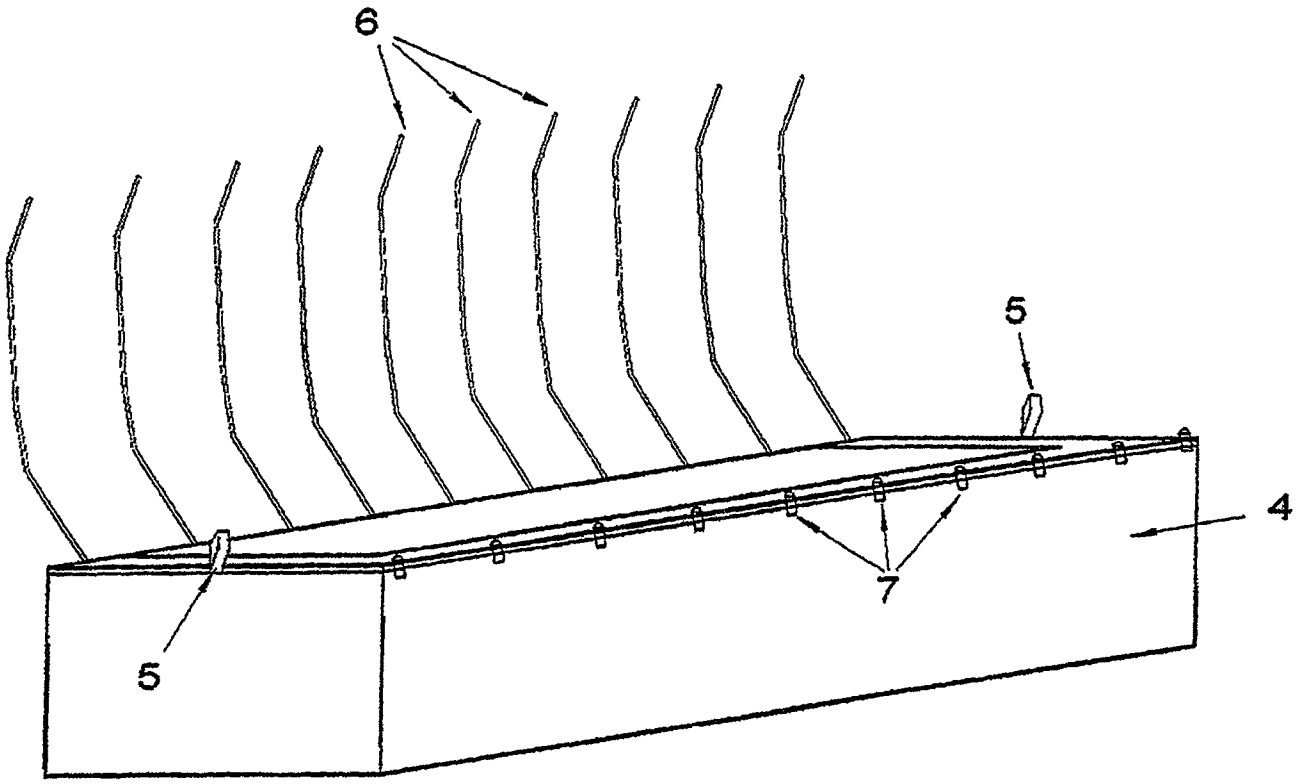
FIG. 6 is a perspective view of another embodiment of the containment bag invention.

Shown in FIG. 6 is another embodiment of the container bag 4. Bag 4 is shown having a single top opening, closable with a zipper. Also shown are loops 5 on one side of the top and a series of straps 6 on the opposite topside. As shown, the matching loops are D-ring loops 7. The straps are of length sufficient to cross the top surface of the bag and tie into loops on the opposite top side. The straps may be tied into or coupled to straps positioned on the opposite side instead of tied into D-rings. When so secured, these straps help resist "flapping" of the bag top during transport in an open container, such as a railcar gondola.

As can be seen, when the bag of FIGS. 5 and 6 is opened, the container top opening is substantially aligned with the bag opening. This alignment provided for access to the container interior from anywhere along the container top edge.

Another bag design that provides access to the entire interior of the container is a single centered zippered bag, having excess material on the top surface to allow the top to be folded over the top edge of the container, in an inside out relationship. The following is a description of the construction of such a bag using a single sheet of material (or a single sheet of multilayered materials.

Figure 7B:
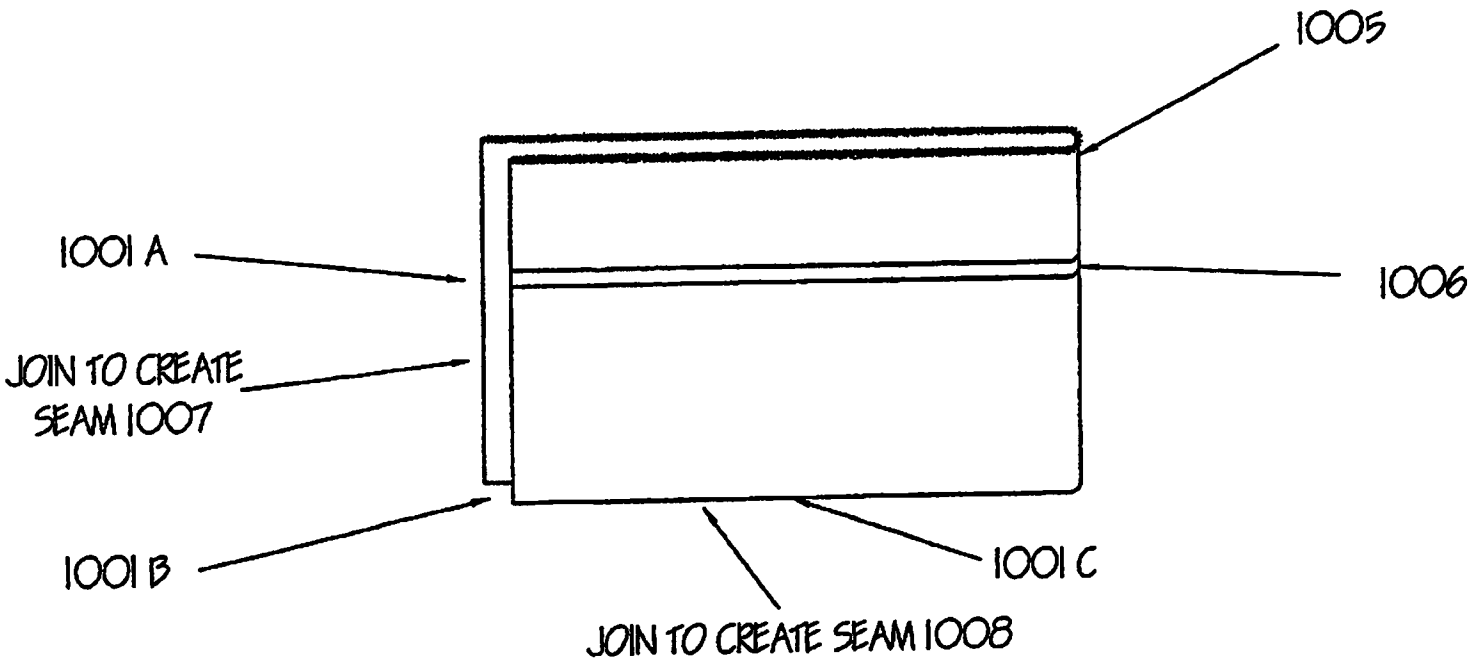
FIG. 7B is a plan view of the folded sheet of FIG. 7A.
Figure 10:
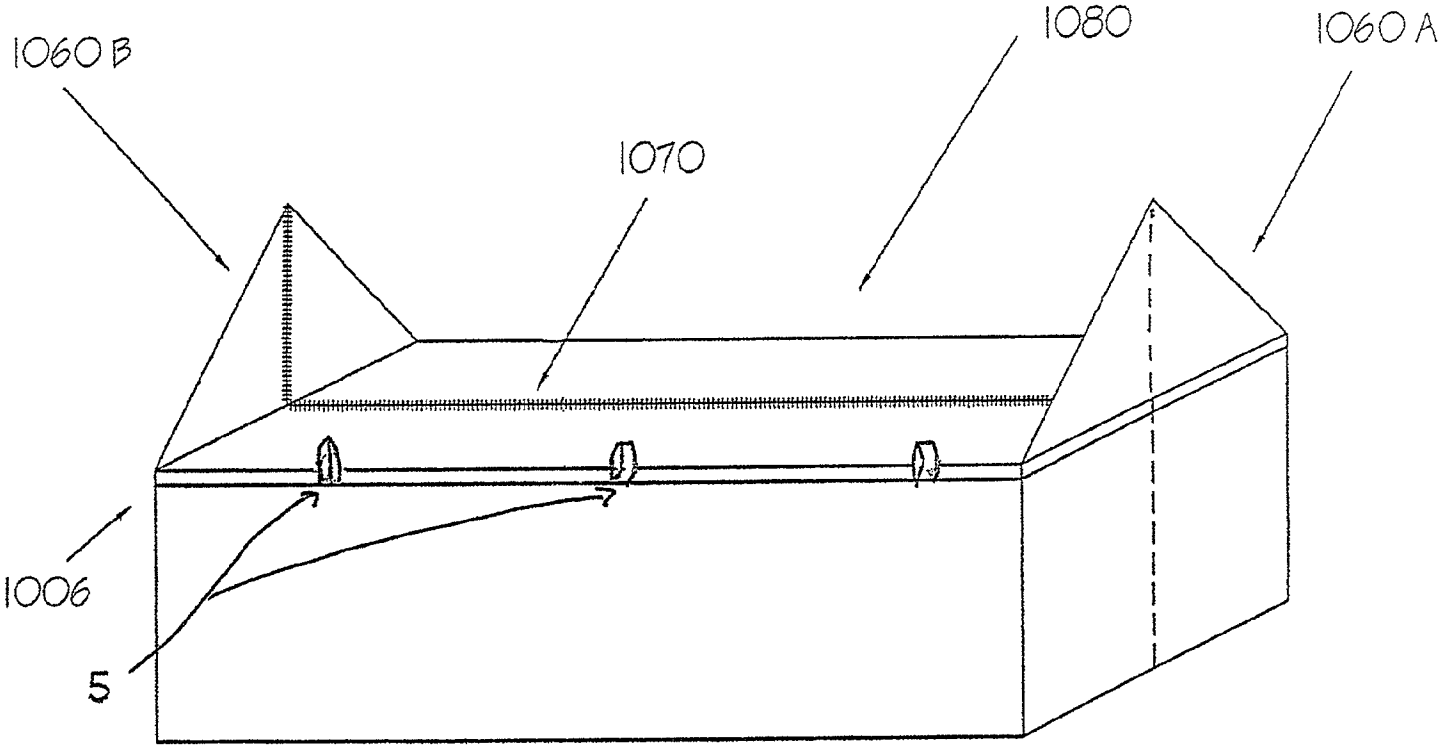
FIG. 10 is a perspective view of the completed bag of FIG. 8 with the top zipper closed.

A preferred means of construction is to build the bag from a single fabric sheet 1005 or a single multilayer fabric sheet. The multiple sheets can be coextensive when laid on top of one another, or the innermost fabric can be shorter in height than that of the outermost fabric if it is not desired to have the top of the resulting bag lined. Additionally, multilayered designs are possible. For ease of explanation, construction will be described using a single sized multilayer fabric piece, with two side edges 1001A and 1001B, a bottom edge 1001C, and a top edge 1001D, as shown in FIG. 7A. Using a single fabric piece constructed in the present manner, the resulting constructed bag will have a center opening on the bag top, preferably closable with a zipper 1070, such as shown in FIG. 10. To construct the bag with a zippered opening, one side of a zipper chain 1005 is attached one of the long edges of the fabric, shown in FIG. 7A, at the top edge. Generally, a sewn attachment is preferred, and to form a seam. It is preferred that the edges of the fabric on the seam be folded over about 1.5-2 inches to create extra strength at the seam. This is desirable for all seams in the bag or liner.

Also attached lengthwise and parallel to the half zipper chain is a strap band 1006. In the present embodiment, this strip is positioned so that when the bag is complete, the strap band 1006 is positioned at or near the top edge of the completed bag. The strap band 1006 can be eliminated depending if top closure straps are not needed. If the strap band is not used, it is still desired, in a multilayered fabric embodiment, to place a stitch along a horizontal line at or near the location that will become the top edge of the completed bag. Such a stitch or join will keep the inner liner top from separating from the outer liner top and collapsing into the bag interior.

Figure 7C:
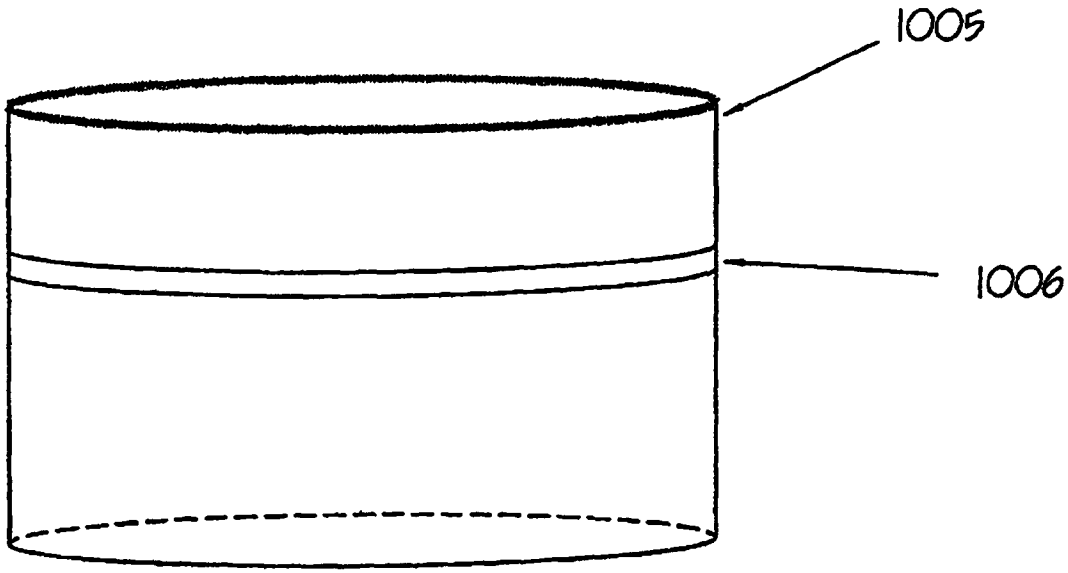
FIG. 7C is a perspective view of the cylinder formed by joining the sides of the sheet in FIG. 7B.
Figure 7D:
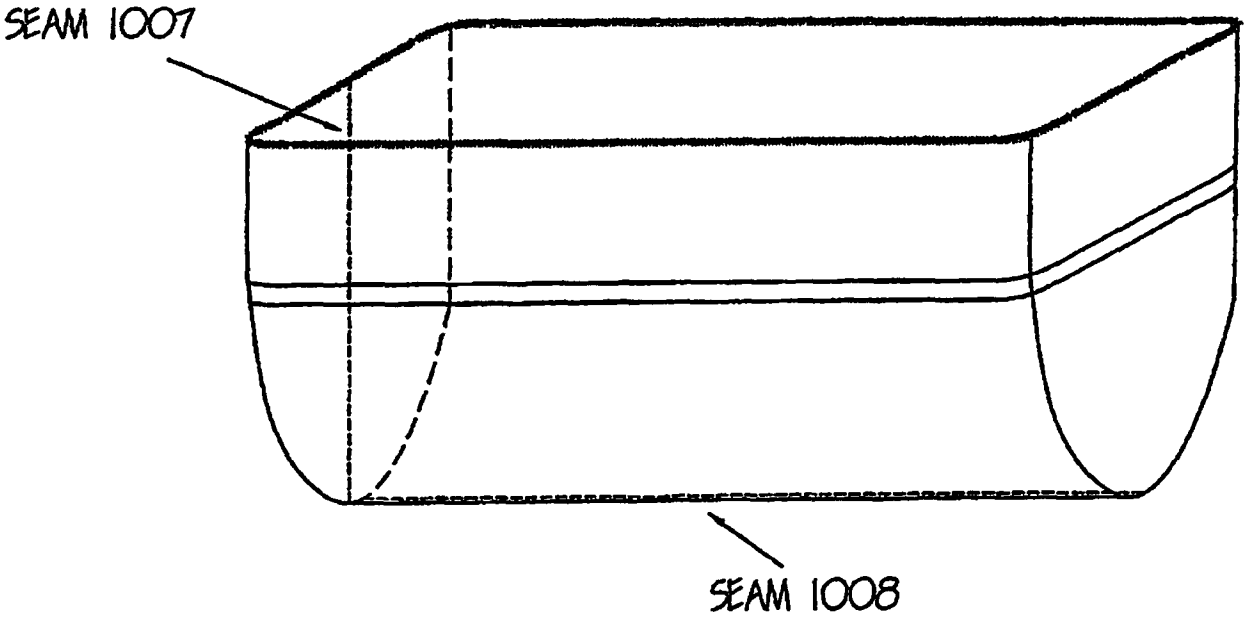
FIG. 7D is a perspective view of the cylinder in FIG. 7C with a bottom seam.

For instance, to form an 8'4"×8'10' bag, a single or multilayer fabric piece of 12'×14'6' is used. To construct the bag, the single piece of bag fabric 1001 has the two ends 1001A and 1001B joined together, creating an opened top and bottom oblong cylinder FIG. 7C. The bottom edge of the cylinder 1001C (the edge opposite that having the zipper edge) is closed by attaching (preferably a sewn attachment) the opposing sides of the bottom edge of the cylinder (e.g. flatten the cylinder, creating two opposed sides, and attach the opposed sides). See FIG. 7D. The resulting structure resembles an open end toothpaste tube, with a seam 1008 running across the tube's bottom and up one side 1007. It is preferred that the tube like structure be created in a single step: the fabric piece 1001 is folded to align edges 1001A and 1001B, and a join (such as by sewing) edges 1001A and 100B together, and the opposing sides of the folded bottom edge 1001C joined together, creating a bottom seam 1008 and single side seam 1007 (see FIG. 7B).

Figure 8A:
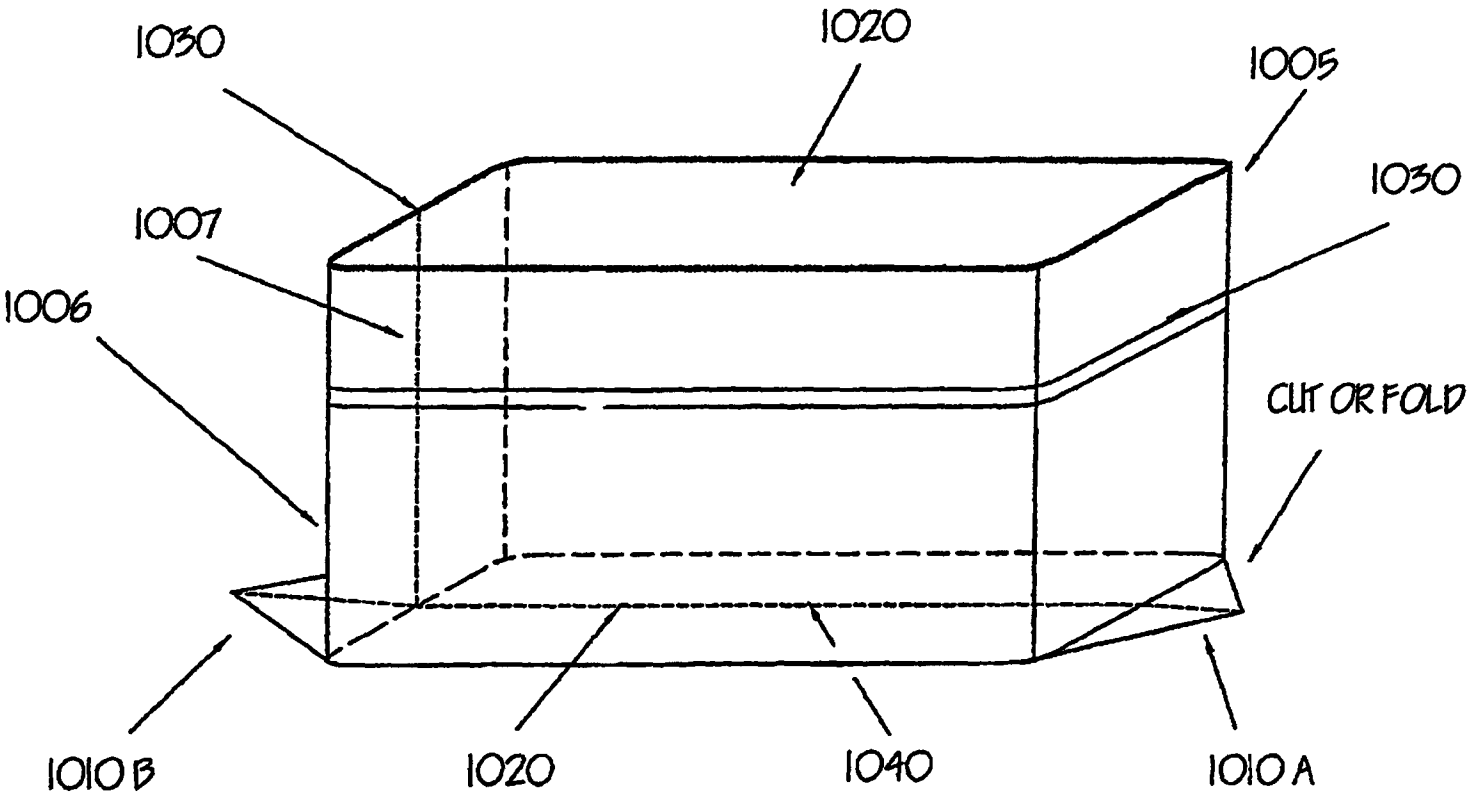
FIG. 8A is a perspective view of the bag of FIG. 7D with a flattened bottom.
Figure 8B:
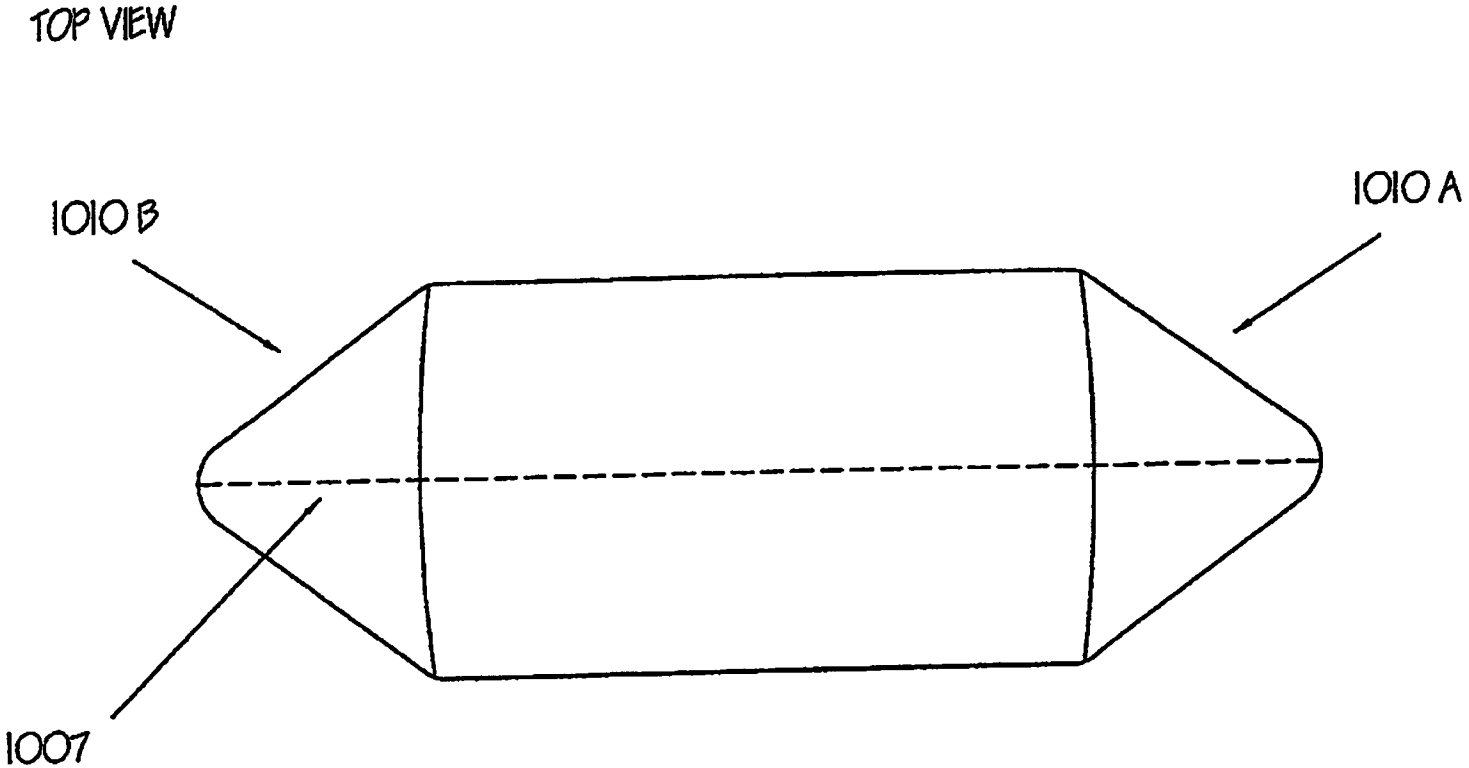
FIG. 8B is a top view of the bag of FIG. 8A.
Figure 8C:
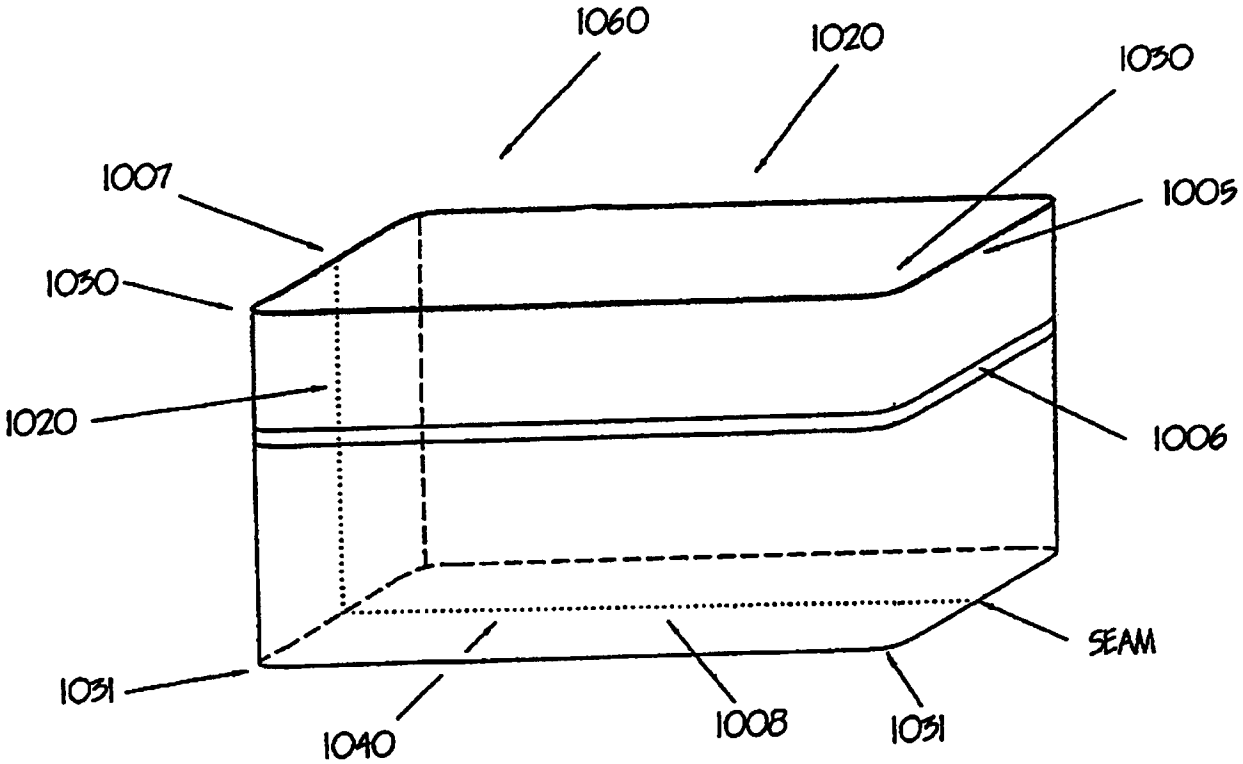
FIG. 8C is a perspective view of the bag of FIG. 8A with the triangular folds removed.
Figure 8D:
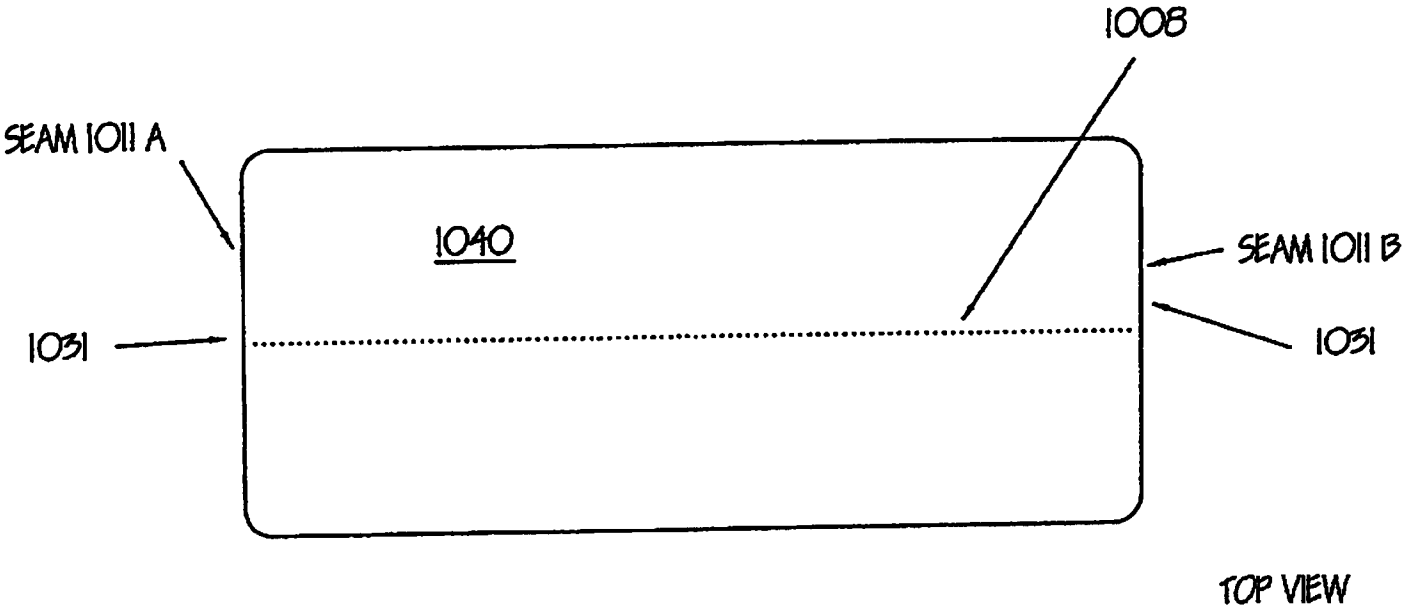
FIG. 8D is a top view of the bag in FIG. 8C.
Figure 9A:
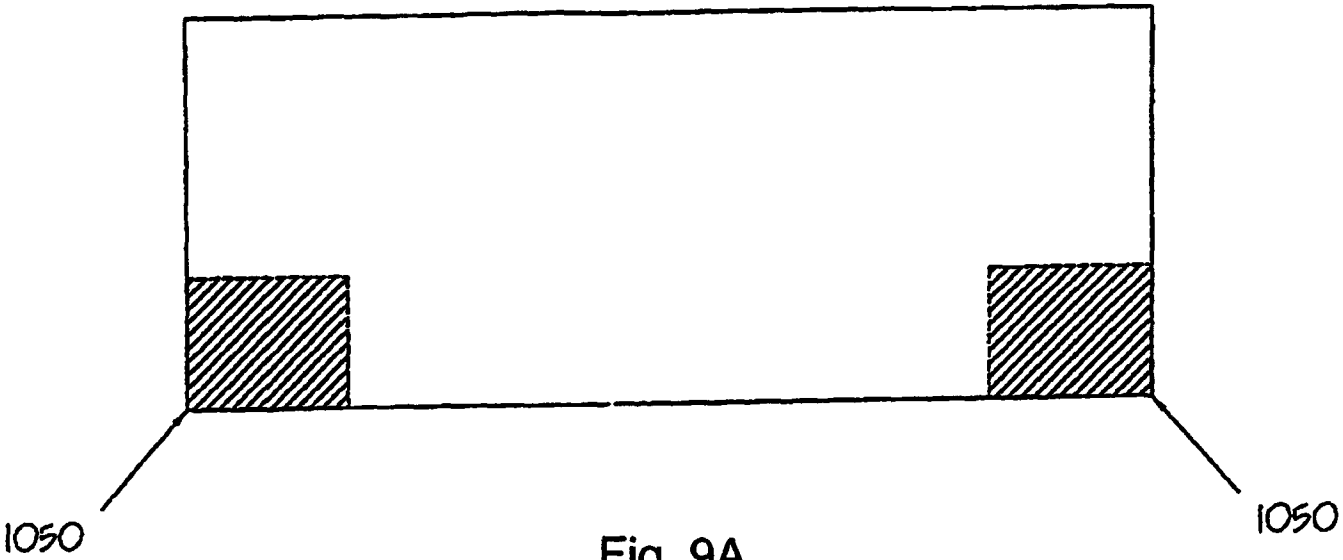
FIG. 9A is a plan view of the single piece construction removing fabric before assembly.

If a rectangular box like structure is desired for the bottom, the bottom closed end of the tube structure is flattened inwardly, with excess bottom fabric forming two triangular shaped flaps [1010A and 1010B] that extend outwardly from the tube bottom (see FIGS. 8A and 8B). It is preferred that the triangular folds 1010A and 1010B be formed so that the bottom seam or join 1008 forms the perpendicular bisector of the triangular flaps 1010A and B (see FIG. 8B). Each triangular flap 1010A and 1010B is cut or sheared off and the cut edges joined (preferably by sewing) creating two bottom edge seams, 1011A and 1011B. The resulting structure now approximates a rectangularly shaped open top box structure, having two long sidewalls 1020, two shorter endwalls 1030 and a bottom 1040. See FIG. 8C. As seen in FIG. 8D, the bottom of the structure has a seam running down the center of the bottom 1008 and along the two edges of the bottom 1031 adjacent the endwalls. In the preferred embodiment, one of the endwalls 1030 has a seam 1007 running from the top to the bottom edge (see FIG. 8C). The fabric 1050 that will form these triangular folds can be removed or excised from the single fabric piece prior to assembly (such as shown in FIG. 9A), but this is not preferred, as it makes seam alignment during construction more critical for quality control. Alternatively, instead of removing these triangular folds, the folds could be folded up and attached to the end walls or folded down and attached to the bottom of the structure. In many instances, the bottom structure can remain a tube like structure, without adjustments for rectangular shape.

Figure 9B:
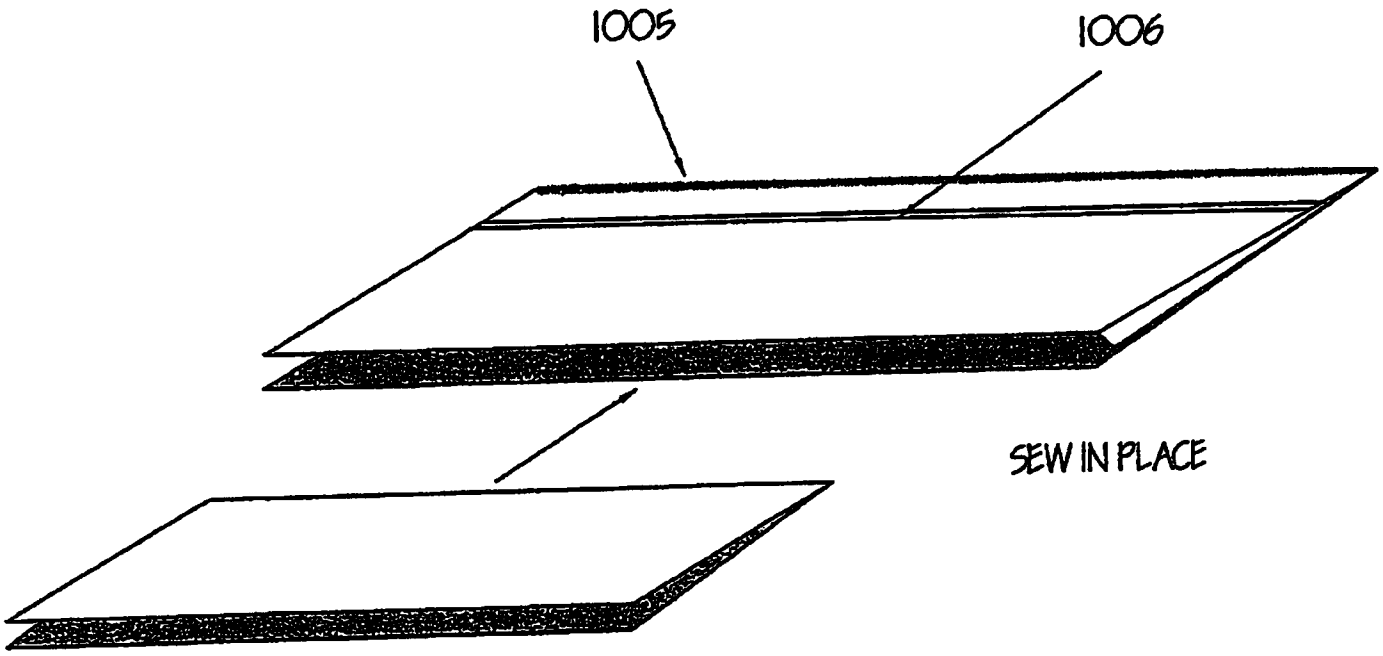
FIG. 9B is a plan view of a two piece construction embodiment having a separate bottom.
Figure 9C:
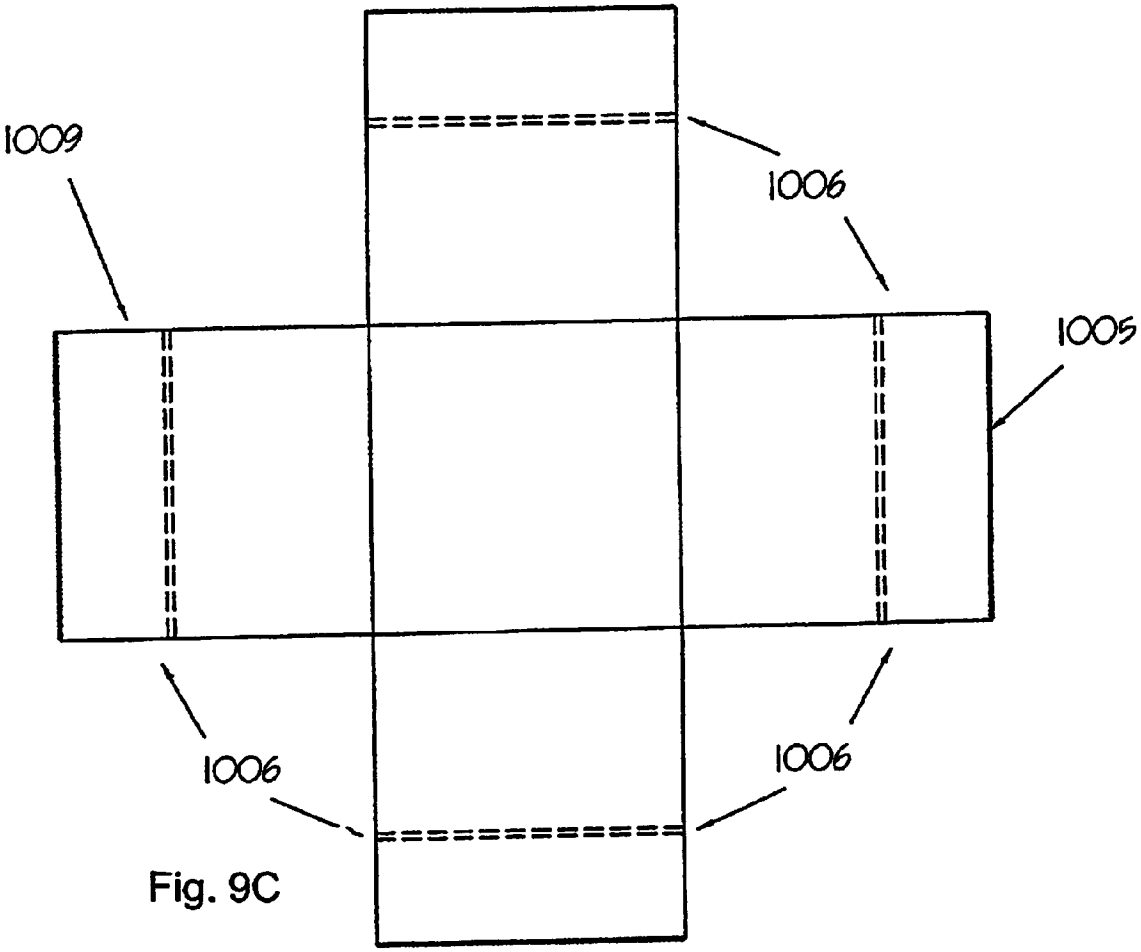
FIG. 9C is a plan view of a two piece construction using two overlapping panels.

As described above, an open top boxlike or (tubelike) structure is constructed from a single fabric sheet. Alternatively, this same structure may be formed from two fabric pieces, the first fabric piece forming the sidewalls of the structure having the ½ zipper chain 1005 attached and strap band 1006 attached. A separate bottom is then sewn in, such as shown in FIG. 9B, but this is not preferred.

The next step is to form the top of the bag. Along the open top edge 1001D of the boxlike structure 1060 is the single side of a zipper chain 1005. The opposing sides of the open top are now operationally joined into a closable opening by attaching a zipper slide to the two half zipper chains, creating a functional zipper 1070. Two zipper slides may be added if desired. Zipper stops are added at the two opposing ends of the zipper to maintain the zipper slide on the resulting zipper 1070. A #10 nylon coil zipper has been employed. The zippered top, when closed, again creates a toothpaste tube-like top end. The top end is pushed inwardly, again creating two triangular folds 1060A and 1060B on the top 1080 of the box shaped bag with the zipper bisecting the two triangular folds. See FIG. 10. As shown in FIG. 10, boxlike bag structure now has the strap band 1006 positioned adjacent or near the top periphery of the edge forming the top portion 1080 of the bag.

Figure 11A:
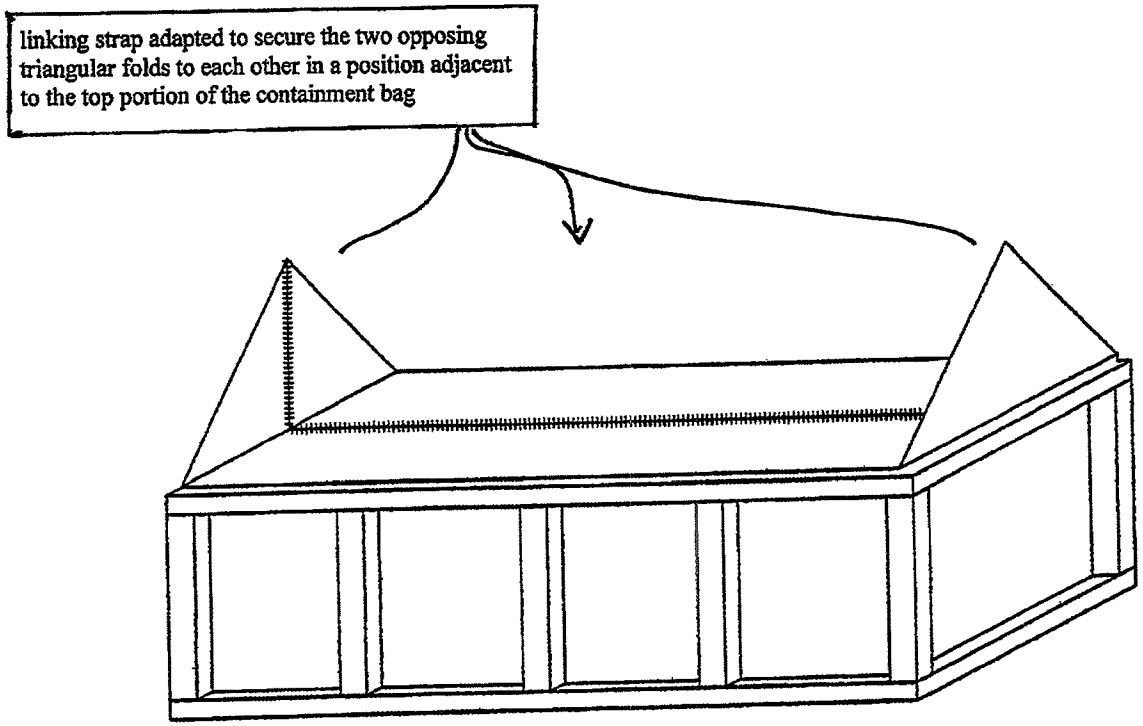
FIG. 11A is a perspective view of the competed bag of FIG. 10 placed in a container with the top zippered closed.
Figure 11B:
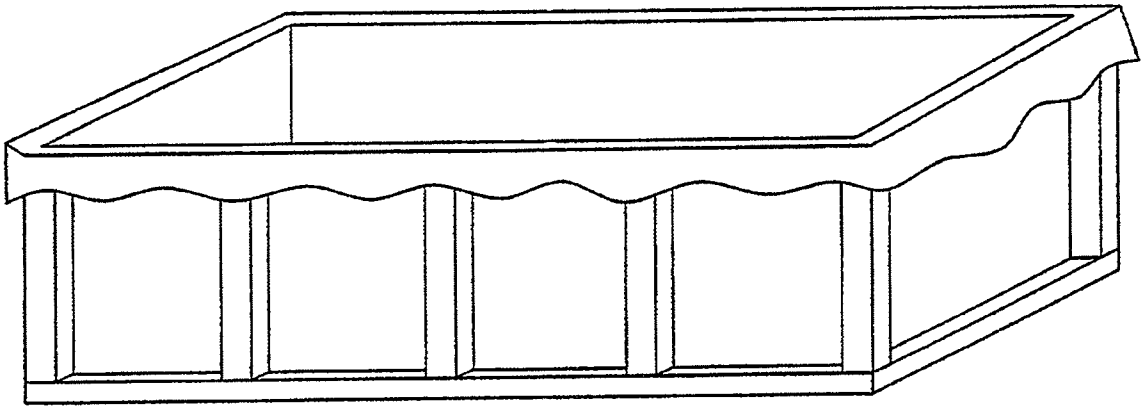
FIG. 11B is a perspective view of the completed bag of FIG. 10 in a container with the top open and inverted.

These top triangular flaps, 1060A and 1060B, are designed to allow the top, when unzipped along the centerline, to be inverted "inside out" thereby allowing the top portion 1080 be folded over the edges of the container or frame that the bag is placed in, thereby exposing the interior of the bag, and the exposed opening is substantially aligned with the open top of the container or frame. The bag is now ready for loading. (See FIGS. 11A and B showing a container with bag placed inside). As described, the top opening of the bag has a zipper closure device, but other closure means could be used, such as ties, loops, Velcro, etc.

When used for debris, the bag may include an inner support liner 30, lining all or part of the interior. The liner can be constructed in multiple layers of differing fabrics or materials for strength, puncture resistance, water resistance, or other desired physical properties. Generally, the inner liner will be a nonwoven layer and the outer layer a woven material. Sandwiched between the two layers may be a liquid impervious material. A preferred material for the innermost layer is non-woven polypropylene of various weights. One embodiment uses a 16oz weight material. A preferred material for the outermost layer is a woven polypropylene: a typical weight is 6.0 oz. The outer woven polypropylene layer may have a coating on one side (generally the exterior side) of polyethylene, such as 1-2 mills thickness. A layer impervious to water and other liquids that can be used is a polyethylene material, such as 6-10 mil thickness. Other materials such as polyvinyl chloride (PVC, reinforced or non-reinforced), woven or non-woven polyethylene or other suitable materials, such as woven fiberglass, may be used.

Figure 12:
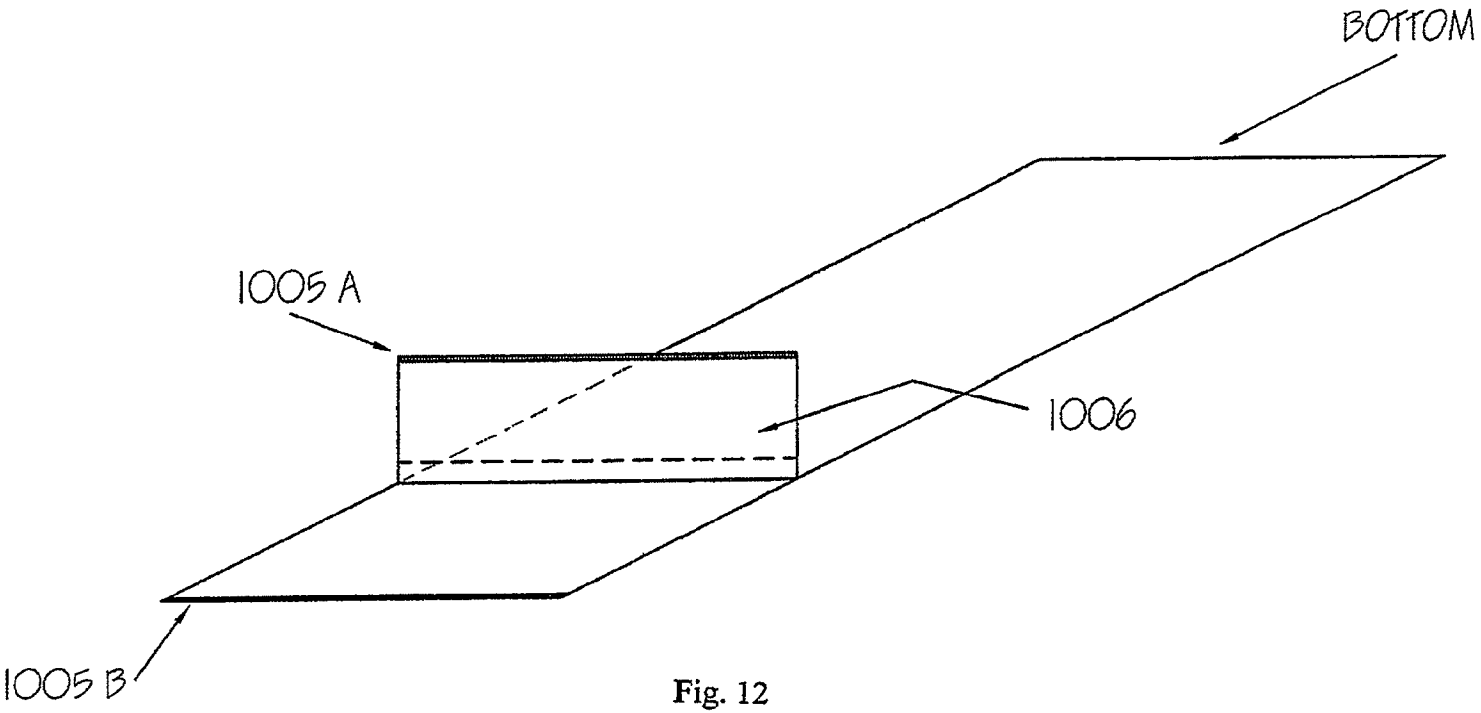
FIG. 12 is a perspective view of a two layer single piece construction having two closable tops.
Figure 14A:
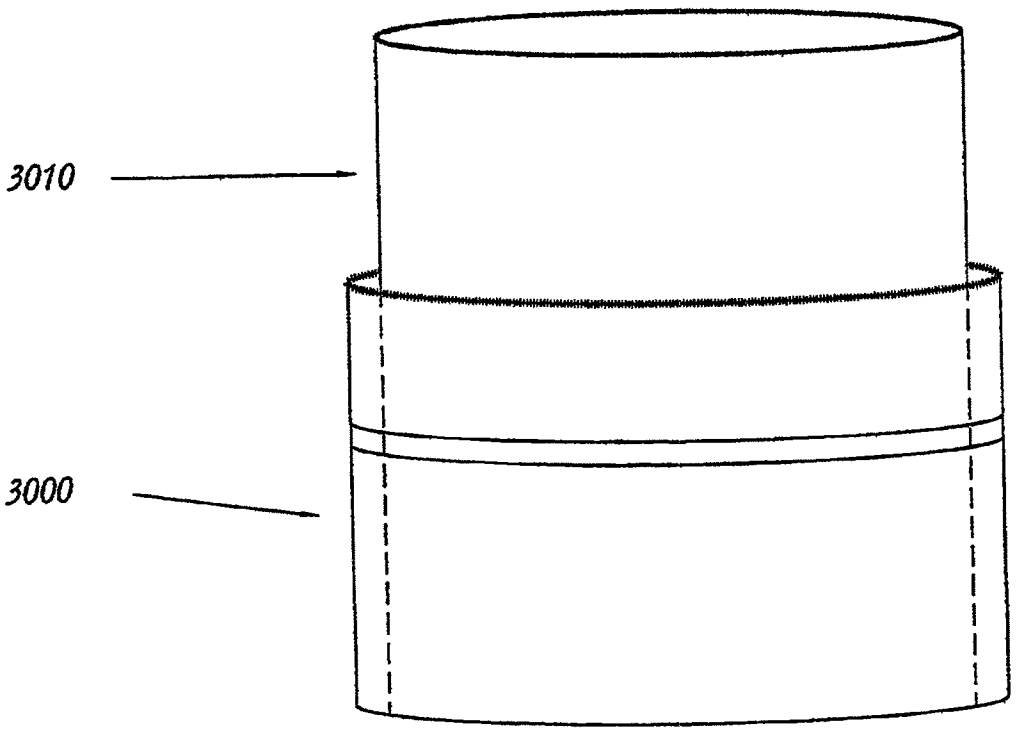
FIG. 14A is a prospective view of a lined bag with lining detached above the edge strip, where the liner extends above the exterior bag fabric.
Figure 15A:
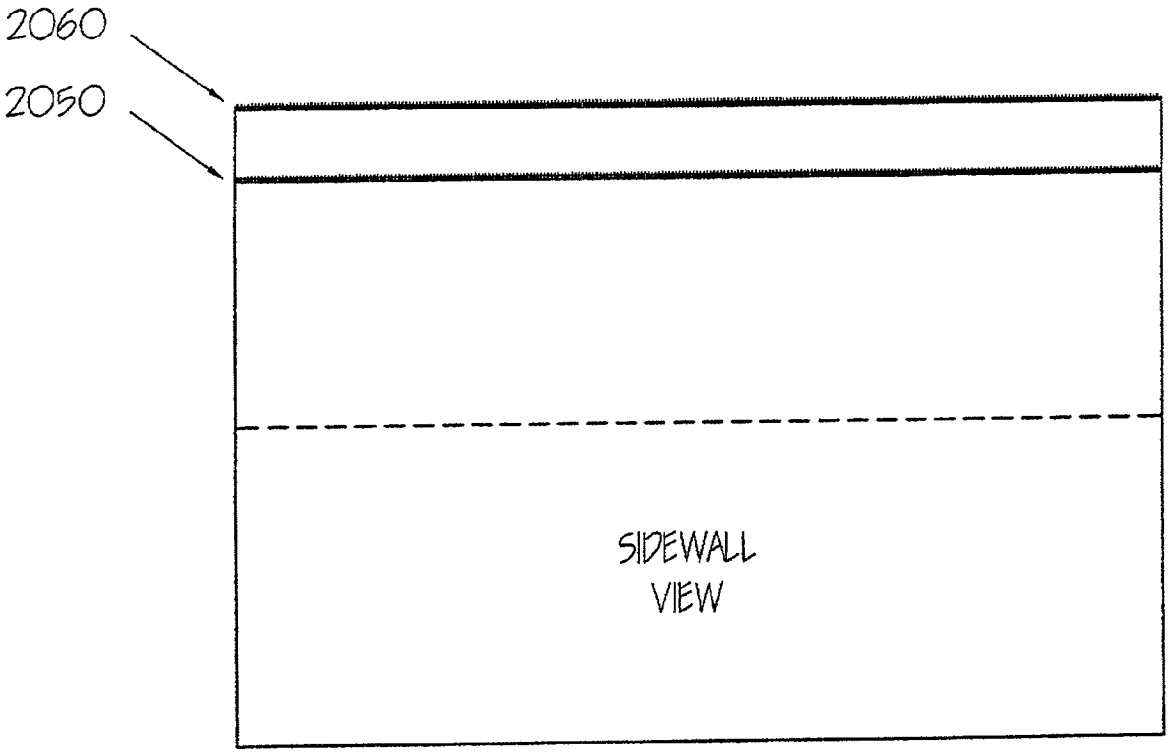
FIG. 15A is a plan view of the single piece double layered fabric composed showing an inner zipper and outer zipper. The view is an interior facing view.
Figure 15B:
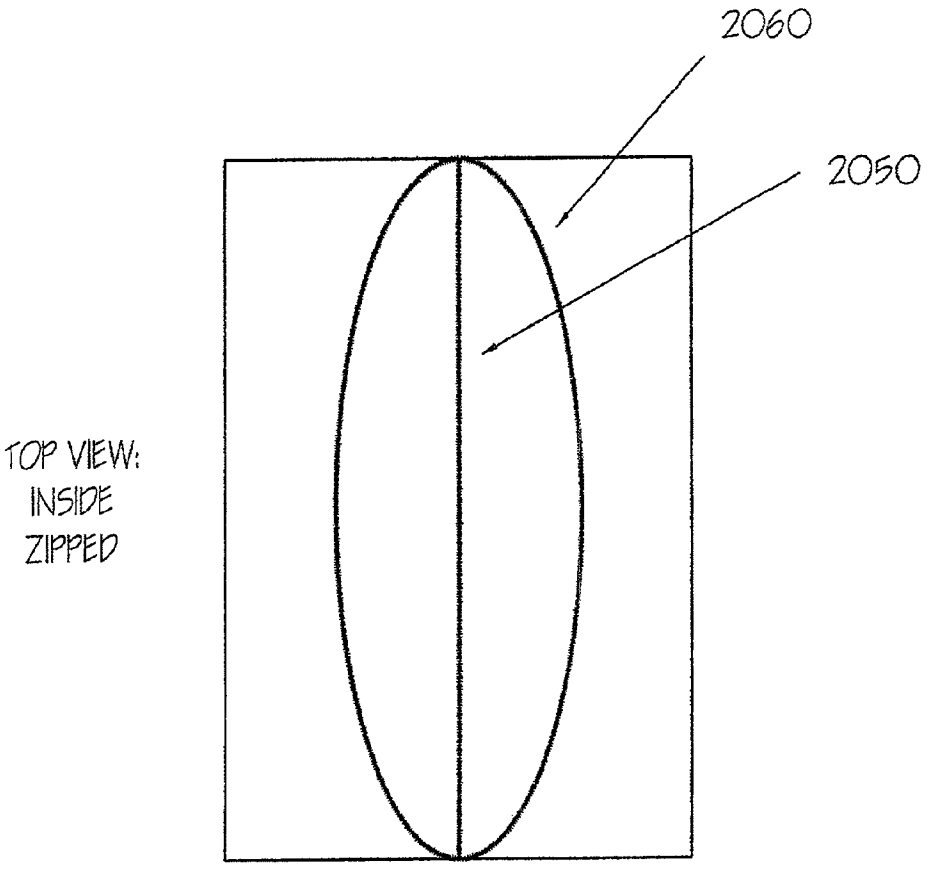
FIG. 15B is a top view showing of a double zippered bag showing the relationship of the zippers.

When using a multilayered construction, each of the layers may each have separate closure means, such as separate zippers, such as shown in FIG. 14A. If two zippers are used, the liner and exterior fabric can be attached near the zippers, or only joined at the edge strip 1006, or joined between the edge strip and the zippers. If joined or attached at the edge strip or substantially below the zippers, the liner and exterior fabric remain as separate flaps above the topmost join or connection between the inner and outer fabrics. Each can have a half zipper chain 1005A and 1005B attached, as shown in FIG. 12. The liner may be cut slightly shorter (2-4 inches) then the topmost fabric (the "topmost" fabric is that fabric that will form the exterior facing fabric), allowing both the liner and outer fabric to be zippered shut separately. Alternatively, both inner and outer lining can be joined together when the ½ chain zipper is added if the inner liner is cut shorter (1-2 inches) or the inner zipper ½ chain 2050 is attached about 1-2 inches below the top edge (see FIGS. 15A and B). The separation of the inner ½ chain zipper 2050 from the outer ½ chain zipper 2060 provides enough freedom between the two zippers on the assembled bag to allow closure of the inner then closure of the outer completed zipper.

Figure 14B:
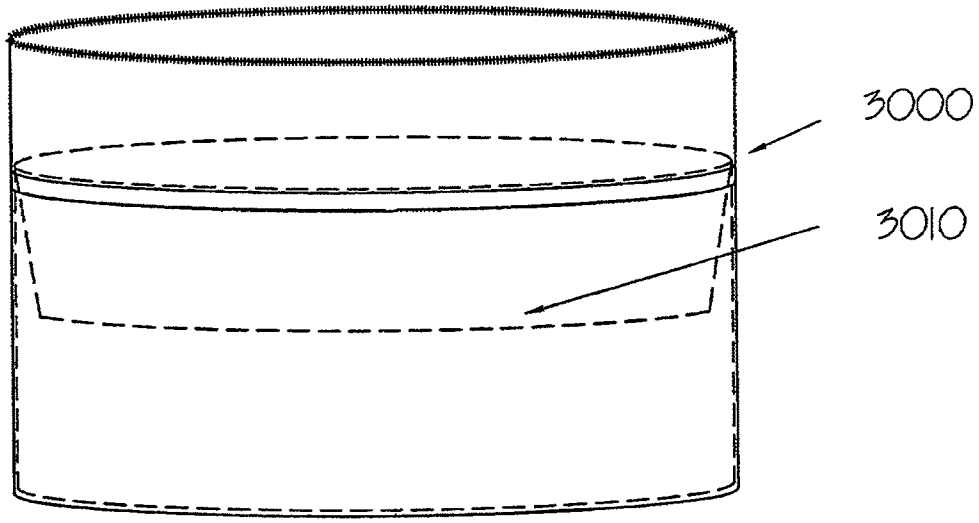
FIG. 14B is a perspective view of the bag of FIG. 14A where the top portion of the liner has been folded inside bag exterior.

Also, the inner liner 3010 may be cut longer, and not attached to the outer fabric 3000 near the top zipper chain 1007. It is preferred, however, that the inner liner be attached to the outer fabric near the top edge or at the edge strip (is so equipped). The enclosure is formed with the inner liner (zippered or not) 3010 extending above the top of the outer fabric 3000 (see FIG. 14 A). The inner liner 30010 extending above the join or seam where the two liners are connected strip is then folded into the interior of the enclosure. See FIG. 14B showing the connection at the edge strip. The top of the bag is then assembled as described above. In use, both exterior and interior fabric is folded inside out near the top section to overlap the container. After the container is filled, the inner liner is re-inverted and can be closed (by zipper if so equipped or the material gathered and tied, etc) or just folded over the debris in the bag. The outer fabric is then re-inverted, and zippered shut.

Figure 13A:
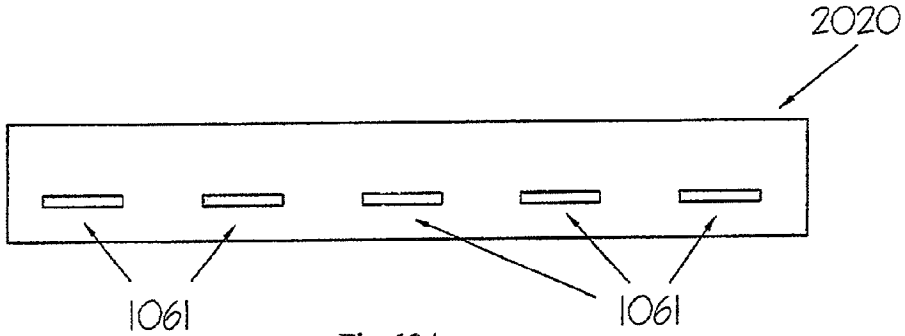
FIG. 13A is a is a side view of one embodiment of an edge strip.

The edge strip 1006, if attached, may be used as a means of attaching the bag support handles 5 (if so equipped) and to provide a place to affix or attach top straps, it the bag is so equipped (the handles 5 may be separately attached to the bag, such as shown on the bag depicted in FIG. 6). One version of the edge strip 1006 is shown in FIG. 13A. As shown, it is a single wide webbing band (about 2 inches wide polyester webbing) with slits 1061 positioned along a line offset from the band center line. The band is sewn to the bag near the bag top edge, and the slits 1061 in the band are positioned to accommodate top straps and/or support handles. Top straps and support handles can be equipped with clip end to clip into the slits, or the top straps and/or support handles could be threaded through and tied to the slit, or a top strap positioned on each opposing side of the edge strip, and joined across the top of the bag, such as with a snap clip, carabiner, etc. or simply tied to one another.

Figure 13B:
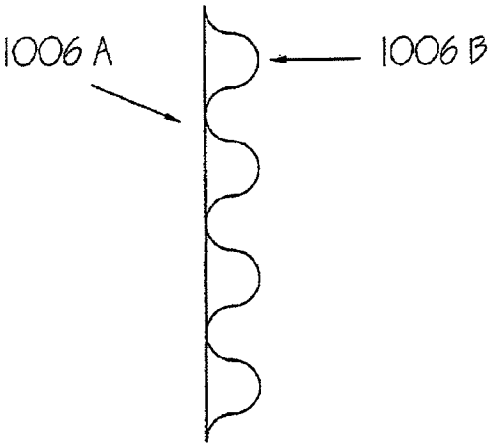
FIG. 13B is a top view of another embodiment of an edge strip
Figure 13C:
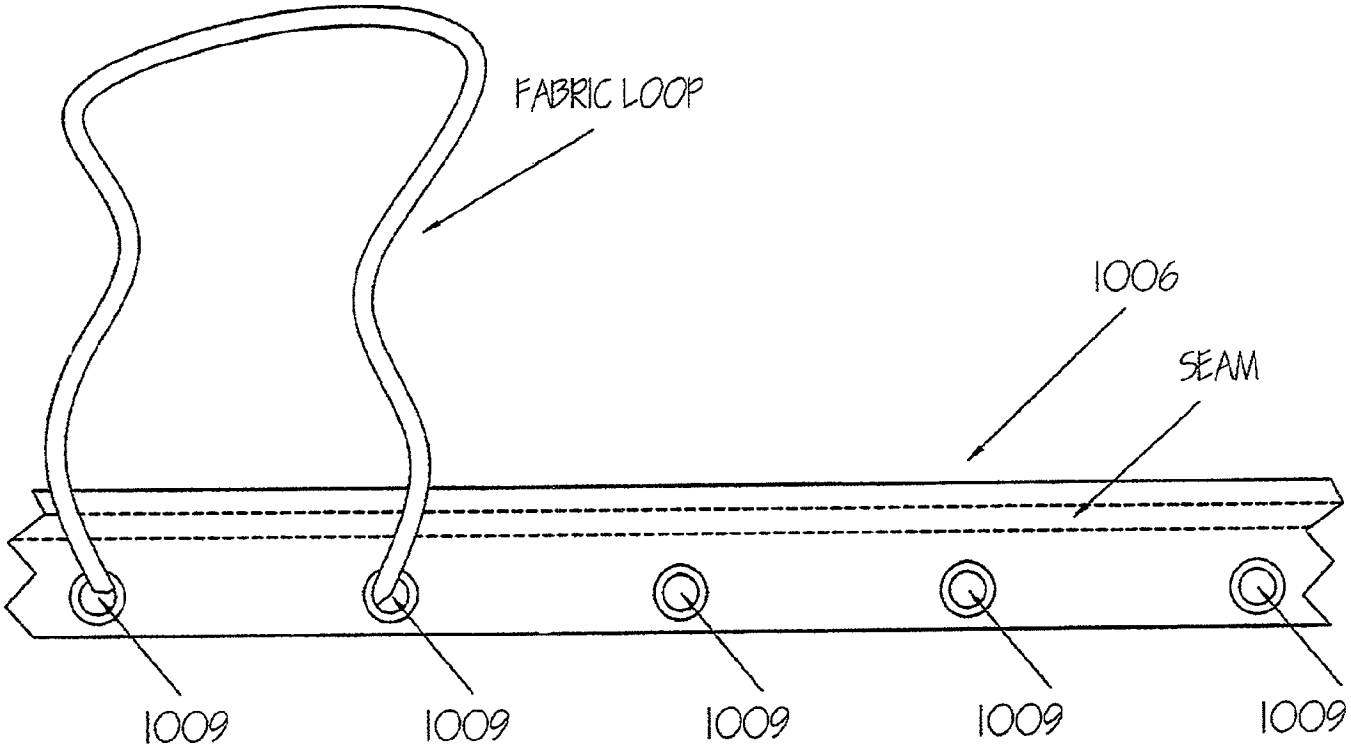
FIG. 13C is a side view of another embodiment of an edge strip.

Instead of a single band with slits as shown in FIG. 13A, the edge strip 1006 can be constructed from two bands, one a straight band 1006A that will be attached to the bag's side and end walls, and as second band 1006B that is attached to the first band 1006A leaving undulations creating openings between the first and second bands. A top view is of this two band arrangement is shown in FIG. 13B. Alternatively, the edge strip 1006 may be a single band with grommets 1009 instead of slits positioned periodically therethrough (FIG. 13C), to clip or tied support handles or top straps to the edge strip. The edge strip may be constructed from 1.5-2.5 inch polypropylene or polyester webbing, 1.5-2.5 inch elastic knitted latex webbing, or other suitable material, such a polyethylene, polypropylene or nylon.

Figure 16:
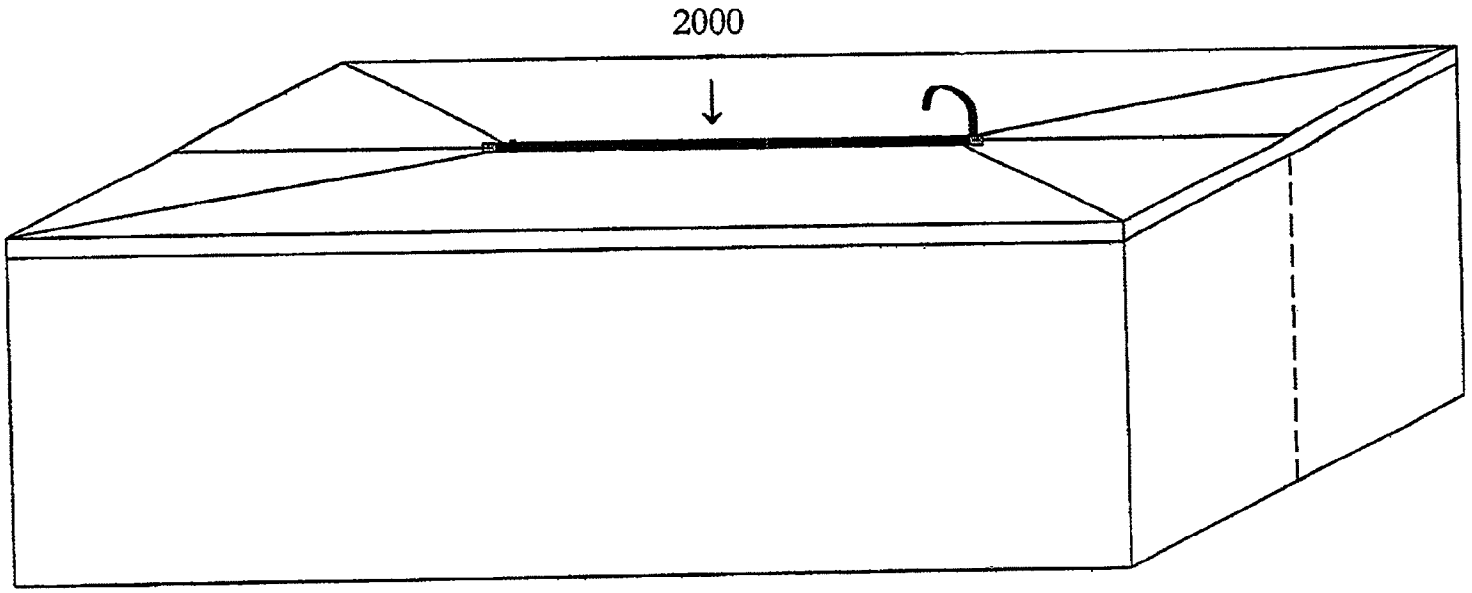
FIG. 16 is a prospective view of one embodiment of a closed liner bag depicting one embodiment of a linking strap between the triangular folds after folding across the bag top.
Figure 17:
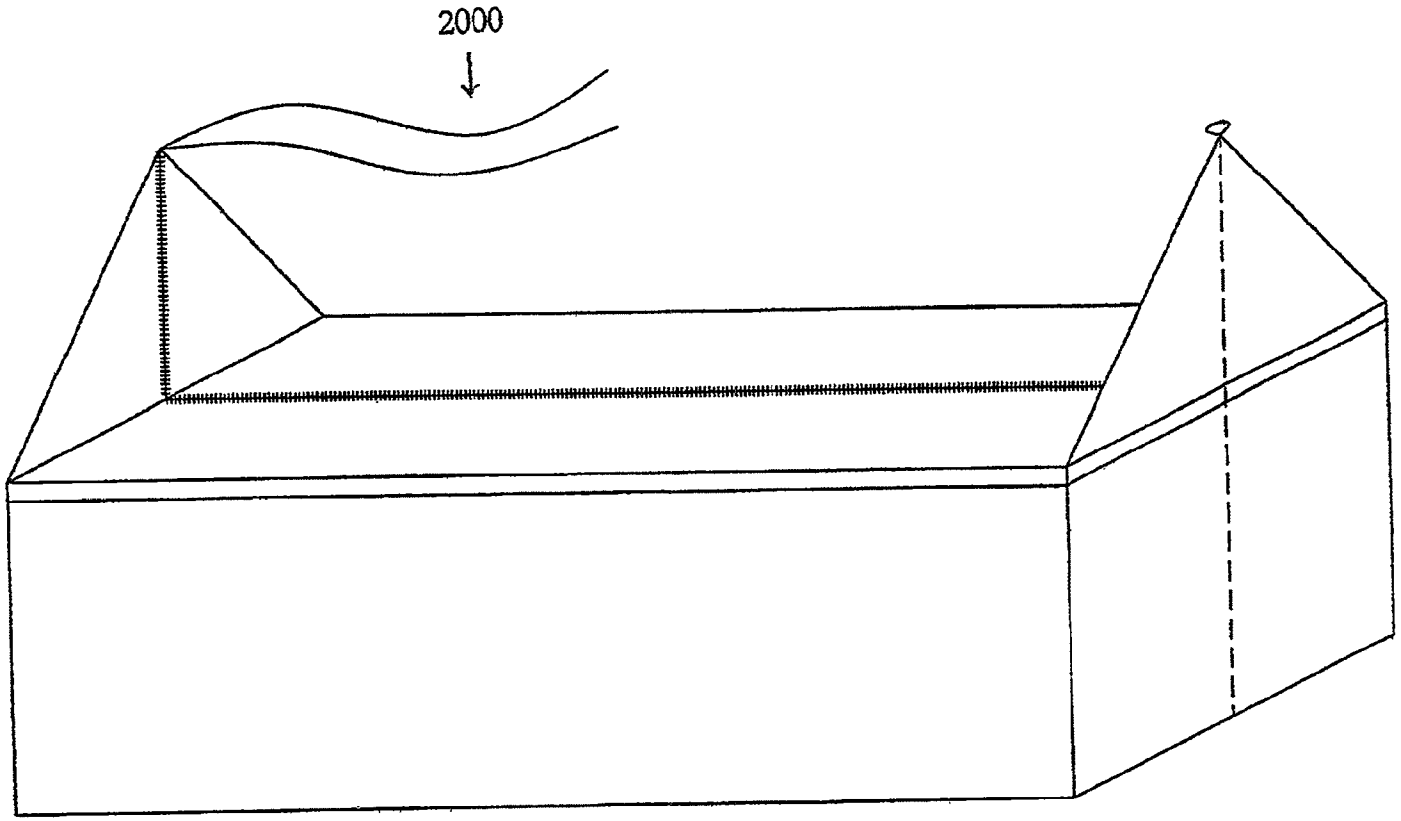
FIG. 17 is a prospective view of one embodiment of a liner bag depicting attachment of the linking strap shown in FIG. 16.

The two triangular shaped folds may be secured to each other with a linking strap 2000 or other type of connector, such as a linear connector (rope, strap or band, bungy cord, etc), to allow the triangular shaped folds be drawn down toward one another and secured to one another or to the top of the container, adjacent to the closed top portion of the containment bag. See FIGS. 16 and 17.

It is intended that the following claims be interpreted as covering all such alterations and modifications as fall within the true spirit and scope of the invention.

The invention claimed is:

1. A containment bag for use in a dumpster container having a plurality of sidewalls defining a top and a bottom, said bottom being closed, said top being substantially open for accepting bulk materials, said plurality of sidewalls including two opposing endwalls, and said bottom defining a dumpster container interior, said containment bag comprising a bag adapted to fit within and line the interior of said dumpster container, said containment bag having a top portion substantially alignable with said top of said dumpster container, said containment bag further having a top edge alignable with the open top of said dumpster container when said containment bag is positioned in and lining a dumpster container, said containment bag having a closable opening positioned on said top portion and said *closable* opening substantially centered on said top portion, said containment bag top portion being adapted to form two opposing triangular shaped folds that extend above said top of said dumpster container when said *closable* opening is closed; and when *said closable opening is* opened, and said triangular shaped folds are unfolded, said *closable* opening on said top portion of said containment bag can be substantially aligned with the open top of a dumpster container when said containment bag is positioned in and lining the dumpster container, said top portion, when said *closable* opening is opened and said triangular folds are unfolded, is adapted to be inverted inside out over said top of said dumpster container; said containment bag being configured to allow said top portion triangular shaped folds to be positioned and retained in a folded position immediately adjacent the remaining portion of said top portion of said containment bag when said containment bag is loaded and said *closable* opening is closed, wherein said *closable* opening has two terminal ends, said containment bag further having a linear connector attachable to said bag top near said two terminal ends of said *closable* opening, said linear connector adapted to draw said terminal ends of said *closable* opening toward one another thereby drawing said top portion triangular shaped folds towards one another in order to position and retain said triangular shaped folds in a folded position immediately adjacent the remaining portion of said top portion of said containment bag when said containment bag is loaded and said *closable* opening is closed.

2. The containment hag according to claim 1 wherein said containment bag further has a lining positioned on said interior surface of said containment bag.

3. The containment bag according to claim 2 wherein said liner further has a top portion having a [second] *separate closeable* opening substantially centered on said liner top portion.

4. The containment bag according to claim 2 wherein said liner and said bag are joined to each other near said opening.

5. The containment bag according to claim 1 further having a series of handles positioned near said top portion.

6. The containment bag according to claim 1 adapted to fit into the interior of a dumpster container selected from the set of roll off containers, gondola rail car containers and end dump containers *and the dumpster container includes a sidewall of at least four feet in height*.

7. The containment bag according to claim 1 wherein said containment bag is constructed of a woven material.

8. A containment bag according to claim 7 wherein woven material is woven polypropylene.

*9. A containment bag for use in a dumpster container having a plurality of sidewalls defining a top and a bottom, said bottom being closed, said top being substantially open for accepting bulk materials, said plurality of sidewalls including two opposing endwalls, and said bottom defining a dumpster container interior, said containment bag comprising a bag configured to fit within and line the interior of said dumpster container, said containment bag having a top portion substantially alignable with said top of said dumpster container, said containment bag further having a top edge alignable with the open top of said dumpster container when said containment bag is positioned in a dumpster container, said containment bag having a closable opening positioned on said top portion and said closable opening substantially centered on said top portion, said containment bag top portion being configured to form two opposing triangular shaped folds that extend above said top of said dumpster container when said closable opening is closed; and when said closable opening is opened, and said triangular shaped folds are unfolded, said closable opening on said top portion of said containment bag can be substantially aligned with the open top of a dumpster container when said containment bag is positioned in the dumpster container, said top portion, when said closable opening is opened and said triangular folds are unfolded, is configured to be inverted inside out over said top of said dumpster*

*container; said containment bag being configured to allow said top portion triangular shaped folds to be positioned and retained in a folded position immediately adjacent the remaining portion of said top portion of said containment bag when said containment bag is loaded and said closable opening is closed, wherein said closable opening has two terminal ends, said containment bag further having linking straps attachable to said top of said bag configured to secure said two opposing triangular shaped folds to each other in a position adjacent to said top portion of said containment bag.*

* * * * *